(12) United States Patent
Imai et al.

(10) Patent No.: US 12,338,504 B2
(45) Date of Patent: Jun. 24, 2025

(54) METHOD FOR PRODUCING GRAIN-ORIENTED ELECTRICAL STEEL SHEET

(71) Applicant: NIPPON STEEL CORPORATION, Tokyo (JP)

(72) Inventors: Takeshi Imai, Tokyo (JP); Shunsuke Okumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 736 days.

(21) Appl. No.: 17/421,766

(22) PCT Filed: Jan. 16, 2020

(86) PCT No.: PCT/JP2020/001166
§ 371 (c)(1),
(2) Date: Jul. 9, 2021

(87) PCT Pub. No.: WO2020/149332
PCT Pub. Date: Jul. 23, 2020

(65) Prior Publication Data
US 2022/0090226 A1 Mar. 24, 2022

(30) Foreign Application Priority Data
Jan. 16, 2019 (JP) .................. 2019-005399

(51) Int. Cl.
*C21D 9/46* (2006.01)
*C21D 1/26* (2006.01)
(Continued)

(52) U.S. Cl.
CPC ............ *C21D 9/46* (2013.01); *C21D 1/26* (2013.01); *C21D 1/68* (2013.01); *C21D 1/74* (2013.01);
(Continued)

(58) Field of Classification Search
CPC .............. C21D 9/46; C21D 1/26; C21D 3/04; C21D 6/005; C21D 6/008; C21D 8/005;
(Continued)

(56) References Cited

U.S. PATENT DOCUMENTS 4,268,326 A    5/1981 Iwayama et al.
4,702,780 A *  10/1987 Inokuchi ................. C22C 38/02
                                                         148/112
(Continued)

FOREIGN PATENT DOCUMENTS

CN    107236852 A   10/2017
EP    0 761 827 B1   1/2002
(Continued)

OTHER PUBLICATIONS

Machine Translation of JP-60131976-A (Year: 1985).*
(Continued)

*Primary Examiner* — Adil A. Siddiqui
(74) *Attorney, Agent, or Firm* — Birch, Stewart, Kolasch & Birch, LLP

(57) ABSTRACT

A method for producing a grain-oriented electrical steel sheet which has an intermediate layer containing silicon oxide as a main component on a surface of a base steel sheet in which a forsterite film is substantially absent and has an insulation coating on a surface of the intermediate layer includes: a decarburization annealing process of obtaining a decarburization-annealed steel sheet which has the oxygen content or 320 ppm or less and the carbon content of 25 ppm or less by subjecting a cold rolled steel sheet containing Si to decarburization annealing; a final annealing process of heating the decarburization-annealed steel sheet in a state in which a surface of the decarburization-annealed steel sheet is coated with an annealing separator to subject a steel sheet to secondary recrystallization; a removal process of obtain-
(Continued)

ing a finally-annealed steel sheet by removing the annealing separator on the steel sheet which has been subjected to the final annealing process; an intermediate layer forming process of forming the intermediate layer by subjecting the finally-annealed steel sheet to thermal oxidation annealing; and an insulation coating forming process of forming the insulation coating on the finally-annealed steel sheet having the intermediate layer formed thereon.

5 Claims, 4 Drawing Sheets

(51) Int. Cl.
| | |
|---|---|
| C21D 1/68 | (2006.01) |
| C21D 1/74 | (2006.01) |
| C21D 3/04 | (2006.01) |
| C21D 6/00 | (2006.01) |
| C21D 8/00 | (2006.01) |
| C21D 8/12 | (2006.01) |
| C21D 9/00 | (2006.01) |
| C21D 9/56 | (2006.01) |
| C22C 38/00 | (2006.01) |
| C22C 38/02 | (2006.01) |
| C22C 38/04 | (2006.01) |
| C22C 38/06 | (2006.01) |
| C22C 38/60 | (2006.01) |
| C23C 22/33 | (2006.01) |
| C23C 22/74 | (2006.01) |
| H01F 1/147 | (2006.01) |
| H01F 1/18 | (2006.01) |

(52) U.S. Cl.
CPC ............... *C21D 3/04* (2013.01); *C21D 6/005* (2013.01); *C21D 6/008* (2013.01); *C21D 8/005* (2013.01); *C21D 8/1233* (2013.01); *C21D 8/1255* (2013.01); *C21D 8/1272* (2013.01); *C21D 8/1283* (2013.01); *C21D 9/0006* (2013.01); *C21D 9/561* (2013.01); *C21D 9/562* (2013.01); *C22C 38/001* (2013.01); *C22C 38/02* (2013.01); *C22C 38/04* (2013.01); *C22C 38/06* (2013.01); *C22C 38/60* (2013.01); *C23C 22/33* (2013.01); *C23C 22/74* (2013.01); *H01F 1/147* (2013.01); *H01F 1/18* (2013.01); *C21D 2201/05* (2013.01); *C22C 2202/02* (2013.01); *H01F 1/14783* (2013.01); *Y02P 10/20* (2015.11)

(58) Field of Classification Search
CPC ................ C21D 8/1255; C21D 8/1272; C21D 8/1283; C21D 1/68; C21D 1/74; C21D 9/0006; C21D 9/561; C21D 9/562; C21D 2201/05; C21D 8/1233; C22C 38/001; C22C 38/02; C22C 38/04; C22C 38/06; C22C 2202/02; C22C 38/60; H01F 1/147; H01F 1/14783; H01F 1/18; Y02P 10/20; C23C 22/33; C23C 22/74
See application file for complete search history.

(56) References Cited

U.S. PATENT DOCUMENTS

| | | |
|---|---|---|
| 5,961,744 A | 10/1999 | Yamazaki et al. |
| 2017/0088915 A1 | 3/2017 | Suehiro et al. |
| 2019/0010572 A1* | 1/2019 | Han ...................... C21D 8/005 |
| 2019/0323100 A1* | 10/2019 | Imamura ............... C22C 38/002 |
| 2019/0382860 A1 | 12/2019 | Han et al. |
| 2020/0123626 A1* | 4/2020 | Takebayashi ........ C21D 8/1222 |

FOREIGN PATENT DOCUMENTS

| | | | | |
|---|---|---|---|---|
| EP | 2 322 674 B1 | | 4/2018 | |
| JP | 60-131978 A | | 7/1985 | |
| JP | 60131976 A | * | 7/1985 | ............. C23C 22/74 |
| JP | 06-184762 A | | 7/1994 | |
| JP | 7-118750 A | | 5/1995 | |
| JP | 7-278668 A | | 10/1995 | |
| JP | 2003-41320 A | | 2/2003 | |
| JP | 2005-68493 A | | 3/2005 | |
| WO | WO 2015/174361 A1 | | 11/2015 | |
| WO | WO-2018084198 A1 | * | 5/2018 | ............... B21B 3/02 |
| WO | WO 2018/117638 A1 | | 6/2018 | |

OTHER PUBLICATIONS

Machine Translation of WO-2018084198-A1 (Year: 2018).*
Morito et al., "Transition From External to Internal Oxidation in Iron-Silicon Alloy as a Function of Oxygen Potential of the Ambient Atmosphere", Scripta Metallurgica, 1976, vol. 10, pp. 619-622.

* cited by examiner

METHOD FOR PRODUCING GRAIN-ORIENTED ELECTRICAL STEEL SHEET

TECHNICAL FIELD

The present invention relates to a method for producing a grain-oriented electrical steel sheet in which a forsterite film is substantially absent.

Priority is claimed on Japanese Patent Application No. 2019-005399, filed Jan. 16, 2019, the content of which is incorporated herein by reference.

BACKGROUND ART

Grain-oriented electrical steel sheets are utilized as magnetic iron core materials in many cases, and particularly, materials with a low iron loss are required to reduce energy loss. It is known that it is effective to provide tension to the surfaces of steel sheets as a means for reducing iron loss.

In order to provide tension to steel sheets, it is effective to form a coating made of a material with a coefficient of thermal expansion smaller than those of the steel sheets at a high temperature. Final-annealing coatings (forsterite films) formed through reactions between oxides on the surfaces of the steel sheets and annealing separators in the final annealing process can provide tension to the steel sheets and have excellent coating adhesion.

On the other hand, in recent years, it has been clarified that the disordered interface structures between final-annealing coatings and base steel cancels out the coating tension effect with respect to iron loss. For this reason, a technique for further reducing iron loss by obtaining a grain-oriented electrical steel sheet which has been subjected to mirror finishing during final annealing through the technique as disclosed in Patent Document 1 or 2 and then forming a tension coating again has been proposed.

Patent document 1 describes that an atmospheric oxidation degree $P_{H2O}/P_{H2}$ at the time of heating is set to 0.01 to 0.15 to suppress the formation of an iron-based oxide. Furthermore, Patent Document 2 describes that effective decarburization can be performed by setting a heating rate of 770 to 860° C. to 9° C./s or faster.

However, in these patent documents, the sheet thicknesses at the time of decarburization annealing are 0.14 mm and 0.23 mm and a technique applicable to thick materials (0.23 mm or more) is not described.

PRIOR ART DOCUMENT

Patent Document

[Patent document 1]
Japanese Unexamined Patent Application, First Publication No. H07-118750

[Patent document 2]
Japanese Unexamined Patent Application, First Publication No. H07-278668

Non-Patent Document

[Non-Patent Document 1]
N. Morita et al.: Scripta METALLURGICA, 10 (1976), 619-622

SUMMARY OF THE INVENTION

Problems to be Solved by the Invention

An object of the present invention is to provide a method for producing a grain-oriented electrical steel sheet in which a forsterite film is substantially absent and which has excellent magnetic characteristics by achieving both decarburization promotion and oxidation suppression for a steel sheet in a wide sheet thickness range.

Means for Solving the Problem

[1] A method for producing a grain-oriented electrical steel sheet according to an aspect of the present invention which has an intermediate layer containing silicon oxide as a main component on a surface of a base steel sheet in which a forsterite film is substantially absent and has an insulation coating on a surface of the intermediate layer includes: a decarburization annealing process of obtaining a decarburization-annealed steel sheet which has an oxygen content of 320 ppm or less and a carbon content of 25 ppm or less by subjecting a cold-rolled steel sheet containing Si to decarburization annealing; a final annealing process of heating the decarburization-annealed steel sheet in a state in which a surface of the decarburization-annealed steel sheet is coated with an annealing separator to subject a steel sheet to secondary recrystallization; a removal process of obtaining a finally-annealed steel sheet by removing the annealing separator on the steel sheet which has been subjected to the final annealing process; an intermediate layer forming process of forming the intermediate layer by subjecting the finally-annealed steel sheet to thermal oxidation annealing; and an insulation coating forming process of forming the insulation coating on the finally-annealed steel sheet having the intermediate layer formed thereon.

[2] A method for producing a grain-oriented electrical steel sheet according to another aspect of the present invention which has an intermediate layer containing silicon oxide as a main component on a surface of, a base steel sheet in which a forsterite film is substantially absent and has an insulation coating on a surface of the intermediate layer includes: a decarburization annealing process of obtaining a decarburization-annealed steel sheet which has an oxygen content of 320 ppm or less and a carbon content of 25 ppm or less by subjecting a cold rolled steel sheet containing Si to decarburization annealing; a final annealing process of heating the decarburization-annealed steel sheet in a state in which a surface of the decarburization-annealed steel sheet is coated with an annealing separator to subject a steel sheet to secondary recrystallization; a removal process of obtaining a finally-annealed steel sheet by removing the annealing separator on the steel sheet which has been subjected to the final annealing process; and an intermediate layer-insulation coating forming process of forming the intermediate layer and the insulation coating on the finally-annealed steel sheet, in one process.

[3] In the method for producing a grain-oriented electrical steel sheet according to [1] or [2], in the decarburization annealing process, in a soaking area configured to subject the cold-rolled steel sheet to decarburization annealing, an atmosphere gas may be introduced from two locations which are an initial part and a latter part of the soaking area.

[4] In the method for producing a grain-oriented electrical steel sheet according to [3], in the decarburization annealing process, a dew point DP1 of the atmosphere gas introduced from an initial part of the soaking area may be set to 40 to 70° C. and a dew point DP2 of the atmosphere gas introduced from the latter part of the soaking area may satisfy DP2≤DP1 and 60−DP1≤DP2≤100−DP1.

[5] In the method for producing a grain-oriented electrical steel sheet according to any one of [1] to [4], the cold-rolled steel sheet may contain, as a chemical component, in terms of mass %, Si: 0.80 to 7.00%; C: 0.085% or less; acid-soluble Al: 0.010 to 0.065%; N: 0.012% or less; Mn: 1.00% or less; a total amount of S and Se: 0.003 to 0.015%; and the remainder: Fe and impurities.

Effects of the Invention

According to the above aspect of the present invention, it is possible to provide a method for producing a grain-oriented electrical steel sheet in which a forsterite film is substantially absent. In the method for producing a grain-oriented electrical steel sheet according to the above aspect, it is possible to produce a grain-oriented electrical steel sheet having low iron loss and a high magnetic flux density after magnetic aging by achieving both decarburization and steel sheet oxidation suppression in a wide sheet thickness range.

EMBODIMENTS FOR IMPLEMENTING THE INVENTION

Figure 1:
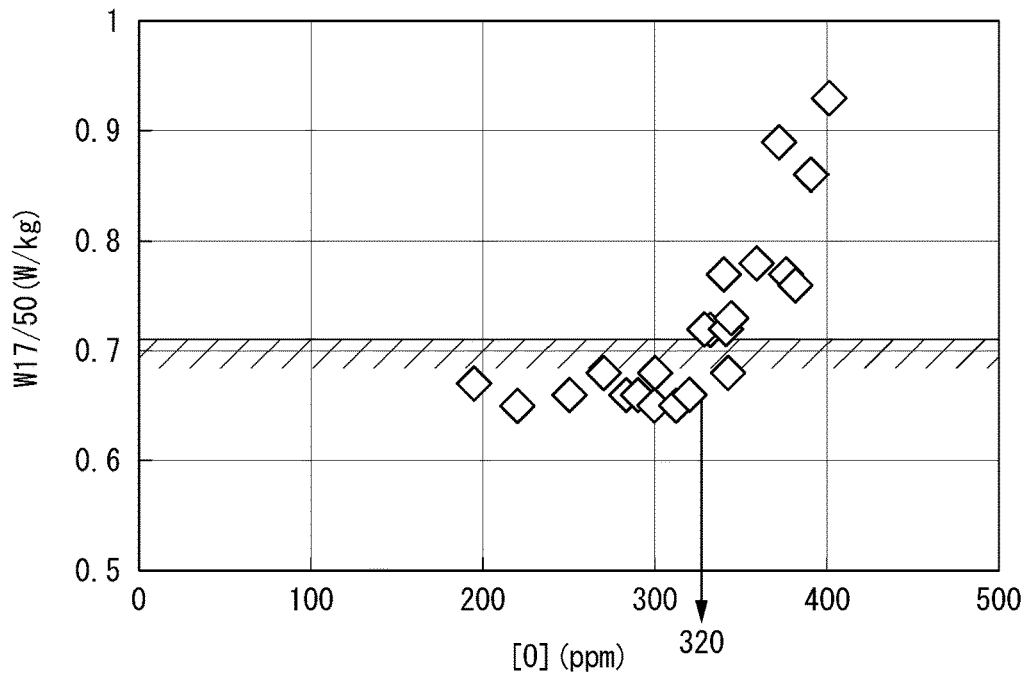
FIG. 1 is a diagram illustrating a relationship between the oxygen content [O] of a steel sheet which has been subjected to decarburization annealing and iron loss of a final product.

As described above, a disordered interface structure between a forsterite film and base steel cancels out the coating tension effect with respect to iron loss. For this reason, the inventors of the present invention have proceeded with research concerning a method for producing a grain-oriented electrical steel sheet in which a forsterite film is substantially absent. Furthermore, in the grain-oriented electrical steel sheet in which a forsterite film is substantially absent, in order to ensure the adhesion of the insulation coating, the premise is a method for forming an intermediate layer containing silicon oxide as a main component on the surface of the base steel sheet and forming an insulation coating on the surface of the intermediate layer.

As a result of the investigation by the inventors of the present invention, it was found that, in the method for producing a grain-oriented electrical steel sheet which has an intermediate layer containing silicon oxide as a main component on the surface of a base steel sheet in which a forsterite film is substantially absent and has an insulation coating on the surface of the intermediate layer, it is possible to obtain a grain-oriented electrical steel sheet in which both decarburization and steel sheet oxidation can be achieved in a wide sheet thickness range and which has excellent magnetic characteristics by performing treatment under specific conditions in the decarburization annealing process and adjusting the oxygen content and the carbon content in a steel sheet which has been subjected to decarburization to specific ranges.

A method for producing a grain-oriented electrical steel sheet according to an embodiment of the present invention (a method for producing a grain-oriented electrical steel sheet according to this embodiment) and a grain-oriented electrical steel sheet produced through the method for producing a grain-oriented electrical, steel sheet according to this embodiment will be described in detail below.

In the following description, when a numerical value range, is indicated using a "lower limit value to an upper limit value," the numerical value range means a "lower limit value or more and an upper limit value or less" unless otherwise stated.

A. Grain-Oriented Electrical Steel Sheet

The grain oriented electrical steel sheet produced through the method for producing a grain-oriented electrical steel sheet according to this embodiment (hereinafter may be referred to as a "grain-oriented electrical steel sheet in this embodiment" in some cases) is a grain-oriented electrical steel sheet which has a three-layer structure including a base steel sheet, an intermediate layer containing silicon oxide as a main component, and an insulation coating in this order.

A basic structure of three layers of the grain-oriented electrical steel sheet in this embodiment will be described below.

1-1. Base Steel Sheet

Although the electrical steel sheet produced through the method for producing a grain-oriented electrical steel sheet according to this embodiment (the grain-oriented electrical steel sheet in this embodiment) has the insulation coating in contact with the intermediate layer mainly composed of silicon oxide, a constitution such as a chemical composition and a structure of the base steel sheet in the grain-oriented electrical steel sheet in this embodiment does not directly relate to a layer constitution of such an insulation coating except that Si is contained as an essential component. For this reason, the base steel sheet in the grain-oriented electrical steel sheet in this embodiment is not particularly limited as long as the actions and effects required in this embodiment can be obtained. For example, a base steel sheet in a general grain-oriented electrical steel sheet can be utilized. The base steel sheet in the grain-oriented electrical steel sheet in this embodiment will be described below.

(1) Chemical Composition

As the chemical composition of the base steel sheet, for example, the chemical composition of a base steel sheet in a general grain-oriented electrical steel sheet can be utilized except that Si is contained as an essential component. Since the function of Si is the same as that in a general grain-oriented electrical steel sheet, the content may be determined within a general range from the characteristics required for the target grain-oriented electrical steel sheet.

In the following description, the amount of each component in the chemical composition of the base steel sheet is a value in terms of mass %. Furthermore, the chemical composition is a chemical composition at a depth of 50 to 60 μm in which a chemical composition of the grain-oriented electrical steel sheet in this embodiment is stable.

A typical example of the chemical composition of the base steel sheet, in terms of mass %, is, an amounts of Si: 0.80% to 7.00% and of Mn: 0.05% to 1.00%, with the remainder being Fe and impurities. Furthermore, in addition to these chemical components, a total amount of S and Se which is contained may be 0.003% or more and 0.015% or less. The reason for limiting a typical example of the chemical composition will be described below.

"Si": 0.80% or More and 7.00% or Less

Si is an essential component which increases electrical resistance and reduces iron loss. Furthermore, when Si is contained at a high concentration, a strong chemical affinity develops between the intermediate layer mainly composed of silicon oxide, and the base steel sheet and the intermediate layer and the base steel sheet adhere to each other more firmly. However, if the Si content exceeds 7.00%, cold rolling is extremely difficult and cracks are likely to occur during cold rolling. For this reason, the Si content is preferably 7.00% or less, more preferably 4.50% or less, and even more preferably 4.00% or less.

On the other hand, if the Si content is less than 0.80%, γ transformation occurs during final annealing, which may impair the preferred crystal orientation of the grain-oriented electrical steel sheet in some cases. For this reason, the Si content is preferably 0.80% or more, more preferably 2.00% or more, and even more preferably 2.50% or more.

"Mn": 0.05% or More and 1.00% or Less

"S and Se": A Total Amount of 0.003% or More, and 0.015% or Less

Mn generates MnS and MnSe together with S and Se and these composite compounds function as an inhibitor. When the Mn content is within the range of 0.05% to 1.00%, secondary recrystallization is stable. For this reason, the Mn content is preferably 0.05% to 1.00%. The Mn content is more preferably 0.08% or more, and even more preferably 0.09% or more. Furthermore, the Mn content is more preferably 0.50% or less, and even more preferably 0.20% or less.

"Remainder"

The remainder is composed of Fe and impurities. The "impurities" mean elements inevitably incorporated from components contained in raw materials when the base steel sheet is industrially produced or components incorporated in a producing process.

1-2. Intermediate Layer

The intermediate layer is formed on the surface of the base steel sheet and contains silicon oxide as a main component. Since the grain-oriented electrical steel sheet does not substantially have a forsterite film, the intermediate layer is formed in direct contact with the surface of the base steel sheet. The intermediate layer has a function of bringing the base steel sheet and the insulation coating to adhere with each other, in the three-layer structure in this embodiment.

In the grain-oriented electrical steel sheet in this embodiment, the intermediate layer means a layer existing between the base steel sheet which will be described later and the insulation coating which will be described later (a compound layer which will be described later).

The silicon oxide which is a main component of the intermediate layer is preferably SiOx (x=1.0 to 2.0), and more preferably SiOx (x=1.5 to 2.0). This is because silicon oxide is more stable. If a sufficient heat treatment in which silicon oxide is formed on the surface of the steel sheet is performed, it is possible to form silica ($SiO_2$).

Containing silicon oxide as main component used means that in a composition of the intermediate layer, the Fe content being less than 30 atom %, the P content being less than 5 atom %, the Si content being 20 atom % or more, the O content being 50 atom % or more, and the Mg content being 10 atom % or less are satisfied, as will be described later.

If an intermediate layer is thin, a sufficient thermal stress relaxation effect may not be exhibited. Thus, the coating adhesion, cannot be ensured. For this reason, a thickness of the intermediate layer is preferably 2 nm or more, and more preferably 5 nm or more. On the other hand, if an intermediate layer is thick, there is a concern concerning a non-uniform thickness and the occurrence of defects such as voids and cracks in a layer. For this reason, the thickness of the intermediate layer is preferably 400 nm or less, and more preferably 300 nm or less. Furthermore, if an intermediate layer is made thinner within a range in which coating adhesion can be ensured, a formation time can be shortened, which can contribute to increased productivity and suppress a decrease in space factor when the intermediate layer is used in an iron core. The thickness of the intermediate layer is preferably 100 nm or less, and more preferably 50 nm or less.

Although a method for measuring a thickness and a position of the intermediate layer is not particularly limited, for example, the thickness and the position of the intermediate layer can be obtained by observing and measuring a cross section of the intermediate layer as follows using a scanning electron microscope (SEM), a transmission electron microscope (TEM), or the like having a diameter of an electron beam of 10 nm.

Specifically, a test piece is cut out through focused ion beam (FIB) processing so that a cut cross section is parallel to a sheet thickness direction and perpendicular to a rolling direction and a cross-sectional structure of this cut cross section is observed (a bright field image) using a scanning-TEM (S IBM) at a magnification at which each layer is included in an observation field of view. When each layer is not included in the observation field of view, a cross-sectional structure is observed in multiple continuous fields of view.

In order to identify each layer in the cross-sectional structure, quantitative analysis of a chemical component of each layer is performed by performing line analysis in the sheet thickness direction using energy dispersive X-ray spectroscopy (TEM-EDS). 100 points in an observation cross section of a sample are measured at intervals of 0.1 μm in a direction parallel to the surface of the base steel sheet. At this time, quantitative analysis is performed at 1 nm intervals in the sheet thickness direction using energy dispersive type X-ray spectroscopy (EDS) having a diameter of an electron beam of 10 nm.

Elements to be quantitatively analyzed are 5 elements such as Fe, P, Si, O, and Mg. Furthermore, in order to identify a compound layer, a crystal phase is identified through electron beam diffraction together with EDS.

A thickness of each layer is measured by identifying each layer from the above-described bright field image observation using a TEM, quantitative analysis of a TEM-EDS, and electron beam diffraction result. Subsequent specifically-identification of each layer and measurement of a thickness are performed all on the same scanning line of the same sample.

A region in which the Fe content is 80 atom % or more is determined to be a base steel sheet. A region in which the Fe content is less than 80 atom %, the P content is 5 atom % or more, the Si content is less than 20 atom %, the O content is 50 atom % or more, and the Mg content is 10 atom % or less is determined to be an insulation coating. Furthermore, a region in which the Fe content being less than 30 atom %, the P content being less than 5 atom %, the Si content being 20 atom % or more, the O content being 50 atom % or more, and the Mg content being 10 atom % or less are satisfied is determined to be an intermediate layer.

If each layer is determined using the components as described above, a region (a blank region) which does not correspond to any of the compositions in the analysis may occur in some cases. However, in the grain-oriented electrical steel sheet in this embodiment, each layer is specifically identified so that a three-layer structure such as the base steel sheet, the intermediate layer, and the insulation coating (including a composition-variable layer) is obtained. The determination criteria are as follows.

First, in the blank region between the base steel sheet and the intermediate layer, the base steel sheet side is regarded as the base steel sheet and the intermediate layer side is regarded as, the intermediate layer using a center of the blank region in a thickness direction as a boundary, Subsequently, in the blank region between the insulation coating and the intermediate layer, the insulation coating side is regarded as the insulation coating and the intermediate layer side is regarded as the intermediate layer using the center of the blank region in the thickness direction as the boundary. Through this procedure, the base steel sheet, the insulation coating, and the intermediate layer can be separated.

1-3. Insulation Coating

The insulation coating is formed on the surface of the intermediate layer and has a function of reducing iron loss as a single steel sheet by providing tension to the steel sheet and ensuring electrical insulation between grain-oriented electrical steel sheets when the grain-oriented electrical steel sheets are laminated and utilized.

The composition of the insulation coating is not particularly limited, can be appropriately selected and utilized from known compositions in accordance with the intended use, and may be either an organic coating or an inorganic coating.

Examples of the organic coating include polyamine-based resins, acrylic resins, acrylic styrene resins, alkyd resins, polyester resins, silicone resins, fluoro-resins, polyolefin resins, styrene resins, vinyl acetate resins, epoxy resins, phenol resins, urethane resins, melamine resin, and the like. Furthermore, examples of the inorganic coating include phosphate-based coatings, aluminum phosphate-based coatings, organic-inorganic composite-based coatings containing the above resin. To be more specific, colloidal silica particles dispersed in a matrix may be baked. Here, the "matrix" is a substrate for an insulation coating, for example, a matrix composed of non-crystalline phosphate. Examples of the non-crystalline phosphate constituting the matrix include aluminum phosphate, magnesium phosphate, and the like. The insulation coating which has been subjected to baking is composed of a plurality of compounds containing one or more of P, O, and S.

If an insulation coating is thin, the tension provided to the steel sheet decreases and the insulating properties also decreases. For this reason, a thickness of the insulation coating is preferably 0.1 µm or more, and more preferably 0.5 µm or more. On the other hand, if the thickness of the insulation coating exceeds 10.0 µm, there, may be a concern concerning cracks occurring on the insulation coating at the stage of forming the insulation coating. Thus, the thickness of the insulation coating is preferably 10.0 µm or less, and more preferably 5.0 µm or less.

The insulation coating may be subjected to a magnetic domain subdivision treatment in which local micro-strained regions or grooves are formed using laser, plasma, a mechanical method, etching, or other methods.

B. Method for Producing Grain-Oriented Electrical Steel Sheet

A method for producing a grain-oriented electrical steel sheet according to this embodiment will be described below.

The method for producing a grain-oriented electrical steel sheet according to this embodiment is the method for producing a grain-oriented electrical steel sheet which has the intermediate layer containing silicon oxide as a main component on the surface of the base steel sheet in which the forsterite film is substantially absent described in the item "A. grain-oriented electrical steel sheet" described above and has the insulation coating on the surface of the intermediate layer. In other words, the method is the method for producing a grain-oriented electrical steel sheet which has the base steel sheet, the intermediate layer formed on the surface of the base steel sheet, and the insulation coating formed on the surface of the intermediate layer. Since the base steel sheet does not have the forsterite film, the intermediate layer is formed in direct contact, with the base steel sheet.

"Producing Method in First Embodiment"

In the method for producing a grain-oriented electrical steel sheet according to the first embodiment, the intermediate layer and the insulation coating are formed in separate processes. That is to say, the method for producing a grain-oriented electrical steel sheet according to the first embodiment has the following processes:

(I) a decarburization annealing process of obtaining a decarburization-annealed steel sheet which has the oxygen content of 320 ppm or less and the carbon content of 25 ppm or less by subjecting a cold-rolled steel sheet containing Si to decarburization annealing;

(II) a final annealing process of heating the decarburization-annealed steel sheet in a state that an annealing separator is applied to a surface of the decarburization-annealed steel sheet to subject a steel sheet (the decarburization-annealed steel sheet) to cause secondary recrystallization to occur;

(III) a removal process of obtaining a finally-annealed steel sheet by removing the annealing separator on the steel sheet (the decarburization-annealed steel sheet) which has been subjected to the final annealing process;

(IV) an intermediate layer forming process of forming the intermediate layer by subjecting the finally-annealed steel sheet to thermal oxidation annealing; and (V) an insulation coating forming process of forming the insulation coating on the finally-annealed steel sheet having the intermediate layer.

"Producing Method in Second Embodiment"

In the method for producing a grain-oriented electrical steel sheet according to the second embodiment, the intermediate layer and the insulation coating are formed at the same time in one process. That is to say, the method for producing a grain-oriented electrical steel sheet according to the second embodiment has the following processes:

(I) a decarburization annealing process of obtaining a decarburization-annealed steel sheet which has the oxygen content of 320 ppm or less and the carbon content of 25 ppm or less by subjecting a cold-rolled steel sheet containing Si to decarburization annealing;

(II) a final annealing process, of heating the decarburization-annealed steel sheet in a state that an annealing separator is applied to a surface of the decarburization-annealed steel sheet to subject a steel sheet (the decarburization-annealed steel sheet) to cause secondary recrystallization to occur;

(III) a removal process of obtaining a finally-annealed steel sheet by removing the annealing separator on the steel sheet (the decarburization-annealed steel sheet) which has been subjected to the final annealing process; and (IV') an intermediate layer-insulation coating forming process of forming the intermediate layer and the insulation coating on the finally-annealed steel sheet in one step.

In the method for producing a grain-oriented electrical steel sheet according to this embodiment, it is, possible to prevent the effect of reducing iron loss due to the insulation coating from being hindered due to the interfacial unevenness between the final-annealing coating and the base steel sheet and to secure the adhesion between the insulation coating and the base steel sheet through the intermediate layer.

Each process in the method for producing a grain-oriented electrical steel sheet according to this embodiment will be described below separately for the first embodiment and the second embodiment.

In the following description, the conditions other than above-described particularly characteristic processes are shown by taking general conditions as an example. Thus, it is possible to obtain the effect of this embodiment even if the conditions are not satisfied.

B-1. First Embodiment

1. Cold-Rolled Steel Sheet for Decarburization Annealing Process

First, a cold-rolled steel sheet used for decarburization annealing which will be described later will be described.

The cold-rolled steel sheet can have a chemical composition of a base steel sheet in a general grain-oriented electrical steel sheet except that Si is contained as an essential component. Since the function of Si contained in the electrical steel sheet is the same as that of a general grain-oriented electrical steel sheet, the content may be determined within a general range from the characteristics required for the target electrical steel sheet.

For example, the chemical composition of the cold-rolled steel sheet can be a chemical composition which contains, in terms of mass %, Si: 0.80 to 7.00%; C: 0.085% or less; acid-soluble Al: 0.010 to 0.065%; N: 0.012% or less; Mn: 1.00% or less; and total amount of S and Se: 0.003 to 0.015% and the remainder: Fe and impurities as an example.

Such a cold-rolled steel sheet can, be produced through, for example, a producing method which includes: a hot rolling process of heating a slab and then subjecting the slab to hot rolling to obtain a hot-rolled steel sheet; a hot-band annealing process of obtaining an annealed steel sheet by subjecting the hot-rolled steel sheet to hot-band annealing; and a cold rolling process of obtaining a cold-rolled steel sheet by subjecting the annealed steel sheet to one cold rolling or two or more cold rollings having intermediate annealing performed between the cold rollings.

Since the chemical composition does not substantially change through slab heating, hot rolling, hot-band annealing, and cold rolling, the slab needs to conform to a known technique in accordance with the chemical composition of the cold-rolled steel sheet to be required. A typical example of the chemical composition contains, in terms of mass %, Si: 0.80% to 7.00%; C: 0.085% or less; acid-soluble Al: 0.010% to 0.065%; N: 0.004% to 0.012%; Mn: 0.05% to 1.00%, and a total amount of S and Se: 0.003% to 0.015%, and composed of the remainder: Fe and impurities.

The reason for limiting typical examples of the chemical compositions of the slab and the cold-rolled steel sheet obtained using the same will be described below.

a. Si: 0.80% to 7.00%

Si is an essential component, which increases electrical resistance and reduces iron loss. Furthermore, when a high concentration of Sis contained, a strong chemical affinity develops between the intermediate layer mainly composed of silicon oxide and the base steel sheet and the intermediate layer and the base steel sheet adhere to each other more firmly. However, if the Si content exceeds 7.00%, cold rolling is extremely difficult and cracks are likely to occur during cold rolling. For this reason, the Si content is preferably 7.00% or less, more preferably 4.50% or less, and even more preferably 4.00% or less.

On the other hand, if the Si content is less than 0.80%, γ transformation occurs during final annealing and the crystal orientation of the grain-oriented electrical steel sheet is impaired. For this reason, the Si content is preferably 0.80% or more, more preferably 2.00% or more, and even more preferably 2.50% or more.

b. C: 0.085% or Less

C is an element effective in controlling a primary recrystallization structure, but adversely affects the magnetic characteristics. For this reason, decarburization annealing is performed before final annealing. If the C content is more than 0.085%, a decarburization annealing time increases and the productivity in industrial production may be impaired in some cases. From these facts, the C content is preferably 0.085% or less. Although a lower limit value of the C content is not particularly limited, the C content is preferably 0.020% or more, and more preferably 0.050% or more.

c. Acid-Soluble Al: 0.010% to 0.065%

Acid-soluble Al binds with N to precipitate as (Al, Si)N and functions as an inhibitor. Secondary recrystallization is stable when the acid-soluble Al content is within the range of 0.010% to 0.065%. For this reason, the acid-soluble Al content is preferably 0.010% to 0.065%. Furthermore, the acid-soluble Al content is preferably 0.015% or more, and more preferably 0.020% or more from the viewpoint of concentrating Al on the surface of the steel sheet in final annealing and utilizing Al as Al among Al and Mg existing on the surface of the steel sheet when forming the intermediate layer in the method for producing a grain-oriented electrical steel sheet of the present invention, as will be described later. Furthermore, from the viewpoint of stability of secondary recrystallization, the acid-soluble Al content is more preferably 0.050% or less, and even more preferably 0.035% or less.

d. N: 0.004% to 0.012%

N binds with Al to function as an inhibitor. If the N content is less than 0.004%, a sufficient amount of inhibitor cannot be obtained. For this reason, the N content is preferably 0.004% or more, more preferably 0.005% or more, and even more preferably 0.006% or more.

On the other hand, if the N content exceeds 0.012%, defects called blisters are likely to occur in the steel sheet. For this reason, the N content is preferably 0.012% or less, more preferably 0.011% or less, and even more preferably 0.010% or less.

e. Mn: 0.05% to 1.00% f. Total of S and Se: 0.003% to 0.015%

Mn generates MnS and/or MnSe together with S and/or Se and the complex compounds function as an inhibitor. Secondary recrystallization is stable when the Mn content is within the range 0.05% to 1.00%. For this reason, the Mn content is preferably 0.05% to 1.00%. The Mn content, is more preferably 0.08% or more, and even more preferably 0.09% or more. Furthermore, the Mn content is more preferably 0.50% or less, and even more preferably 0.20% or less.

Secondary recrystallization is stable when a total amount of S and Se contents is within, the range of 0.003% to 0.015%. For this reason, the total of S and Se contents is preferably 0.003% to 0.015%.

Here, the expression "the total of S and Se contents is 0.003% to 0.015%" means both when the base steel sheet contains only one of S and Se and a total amount of S or Se content is 0.003% to 0.015% and when the base steel sheet contains both S and Se and a total amount of S and Se contents is 0.003% to 0.015%.

g. Other Elements

Various kinds of elements can be contained in place of a part of the remainder: Fe in accordance with known documents in consideration of the enhancement of an inhibitor function due to formation of a compound and the influence on the magnetic characteristics. The targets of the types and amounts of the elements to be contained in place of a part of Fe are, for example, "Bi: 0.010% or less," B: 0.080% or less," "Ti: 0.015% or less," "Nb: 0.20% or less," "V: 0.15% or less," "Sn: 0.10% or less," "Sb; 0.10% or less," "Cr: 0.30% or less," "Cu: 0.40% or less;" "P: 0.50% or less," "Ni: 1.00% or less," "Mo: 0.10% or less," and the like.

h. Remainder

The remainder is Fe and impurities. The "impurities" mean elements incorporated from components contained in raw materials when the base steel sheet is industrially produced of components incorporated in the producing process.

The slab is obtained, for example, by melting steel having the above-described chemical composition in a converter furnace, an electric furnace, or the like, subjecting the steel to vacuum degassing if necessary, and then subjecting the steel to continuous casting, or ingot rolling after ingot casting. A thickness of the slab is not particularly limited, but is, for example, 150 mm to 350 mm, and preferably 220 mm to 280 mm. Furthermore, the slab may be a slab having a thickness of about 10 mm to 70 mm (a so-called "thin slab"). When the thin slab is utilized, rough rolling before final rolling can be omitted in the hot rolling process.

<Hot Rolling Process>

In the hot rolling process, the Si-containing, slab as described above, is heated within a temperature range of, for example, 800° C. to 1300° C. and then is subjected to hot rolling to obtain a hot-rolled steel sheet.

When a heating temperature of the slab is 1200° C. or lower, for example, it is preferable to avoid various problems (a dedicated heating furnace is required, a large amount of melt scale, and the like) when heating is performed at a temperature higher than 1200° C.

When the heating temperature is too low, hot rolling may be difficult and productivity may decrease in some cases. For this reason, a lower limit value of the heating temperature of the slab is preferably 950° C. Furthermore, it is also possible to omit the slab heating process itself and start hot rolling after casting until the temperature of the slab decreases.

In the hot rolling process, the heated slab is subjected to rough rolling and then to final rolling to obtain a hot-rolled steel sheet having a prescribed thickness. After the completion of the final rolling, the hot-rolled steel sheet is coiled at a prescribed temperature.

Also, the sheet thickness of the hot-rolled steel sheet is not particularly limited, but is, for example, 3.5 mm or less.

<Hot-Band Annealing Process>

In the hot-band annealing process, the hot rolled steel sheet is subjected to hot-band annealing to obtain an annealed steel sheet. The hot-band annealing conditions may be general conditions, but is held, for example, at a temperature within the range of 750 to 1200° C. for 30 seconds to 10 minutes.

<Cold Rolling Process>

In the cold rolling process, the annealed steel sheet is subjected to one cold rolling or two or more cold rollings having intermediate annealing performed between the cold rollings to obtain a cold-rolled steel sheet.

A cold rolling ratio in final cold rolling (a final cold rolling ratio) is not particularly limited, but is preferably 80% or more, and more preferably 90% or more from the viewpoint of crystal orientation control.

Also, the sheet thickness of the cold-rolled steel sheet is not particularly limited, but, in order to further reduce iron loss, is preferably 0.35 mm or less, and more preferably 0.30 mm or less.

2. Decarburization Annealing Process

In the decarburization annealing process, the cold-rolled steel sheet is subjected to decarburization annealing to obtain a decarburization-annealed steel sheet.

To be specific, by performing decarburization annealing, primary recrystallization occurs in the cold-rolled steel sheet, C contained in the cold-rolled steel sheet is removed, and the carbon content in the steel sheet which has been subjected to decarburization annealing is 25 ppm or less. It is desirable that the decarburization annealing be performed in a moist atmosphere to remove C. Furthermore, in the decarburization annealing process, the oxygen content after decarburization annealing is controlled to 320 ppm or less by suppressing oxidation.

A decarburization annealing method included in the method for producing a grain-oriented electrical steel sheet according to this embodiment will be described in detail below.

In the grain-oriented electrical steel sheet, about 500 to 600 ppm of carbon is contained to obtain a texture for improving magnetic characteristics. However, after the cold rolling process described above, carbon (C) is not required. In the decarburization annealing process, it is thus necessary to remove the carbon content after annealing to a level in which magnetic aging in a final product such as a transformer is not caused. In the grain-oriented electrical steel sheet having the forsterite film, it is necessary to form an oxide layer having fayalite on a surface layer of the steel sheet. Thus, usually, the cold-rolled steel sheet is annealed at a dew point of 60 to 70° C. and a soaking temperature of 800 to 900° C.

However, in the grain-oriented electrical steel sheet in which a forsterite film is substantially absent such as the grain oriented electrical steel sheet in this embodiment, if annealing is performed under the conditions of a high dew point as described above, oxides (mullite) are formed during high-temperature annealing and oxidation of the steel sheet reduces the smoothness of the surface and reduces the magnetic characteristics. Furthermore, when a dew point is reduced to avoid this, according to the research of the inventors of the present invention, it has been found that a decarburization rate decreases, an amount of residual carbon content increases, and magnetic aging occurs. That is to say, since decarburization promotion and oxidation suppression of the steel sheet are contradictory phenomena in establishing atmospheric conditions, it is difficult to realize a dew point at the time of decarburization annealing under certain conditions.

The inventors of the present invention considered that it is not possible to achieve both decarburization and oxidation suppression by first preferentially performing decarburization at a high dew point and then reducing the dew point to suppress oxidation after completion of decarburization as a decarburization annealing treatment. Based on this idea, the inventors of the present invention investigated the influences of dew point control in the first half of the decarburization annealing treatment and of dew point control in the second half of the decarburization annealing treatment by carrying out the following tests.

Figure 4A:
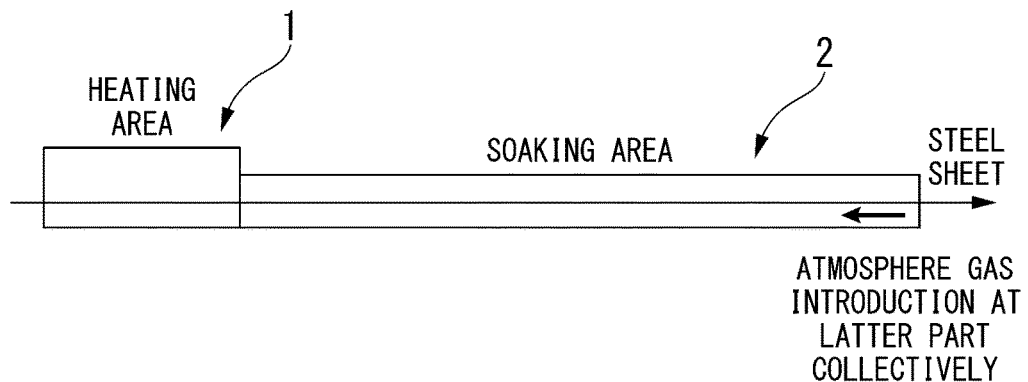
FIG. 4A is a diagram of a constitution when an atmosphere gas is introduced only from a latter part of a soaking area in a decarburization annealing furnace.
Figure 4B:
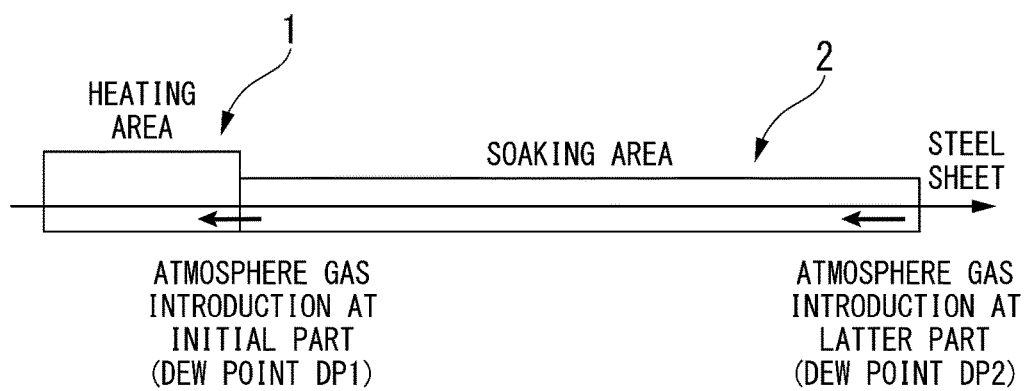
FIG. 4B is a diagram of a constitution when an atmosphere gas is introduced from the two locations of an initial part and a latter part of a soaking area in a decarburization annealing furnace.

These tests were performed using a box-shaped decarburization annealing furnace including a heating furnace 1 and a soaking furnace 2 having the constitutions illustrated in FIGS. 4A and 4B.

As illustrated in FIGS. 4A and 4B, the decarburization annealing furnace is a decarburization annealing furnace in which the inside of the heating furnace 1 is a heating area, the inside of the soaking furnace 2 is a soaking area, the steel sheet can be horizontally transported in the rightward direction indicated by the arrows illustrated in FIGS. 4A and 4B from the heating area toward the soaking area, and a decarburization annealing treatment can be performed on the steel sheet during transportation.

The decarburization annealing furnace illustrated in FIG. 4A is a furnace in which an atmosphere gas can be supplied from a side wall part (a latter part of the soaking area) near an outlet of the soaking furnace 2 into the inside of the soaking furnace 2 in a direction opposite to a direction in which the steel sheet passes.

The decarburization annealing furnace illustrated in FIG. 4B is a decarburization annealing furnace in which an atmosphere gas can be supplied from the side s all part (the latter part of the soaking area) near the outlet of the soaking furnace 2 into the inside of the soaking furnace 2 in the direction opposite to the direction in which the steel sheet passes and an atmosphere gas can be supplied from a bottom part (an initial part of the soaking area (a latter part of the heating area)) near an inlet of the soaking furnace 2 toward the heating furnace 1 side in a direction opposite to a direction in which the steel sheet is transported.

In this embodiment, the initial part of the soaking area refers to a position closer to the heating area side (an upstream side) than a center of the soaking area, the latter part of the soaking area refers to a position closer to a downstream side than center of the soaking area, and the stages are, for example, the positions illustrated in FIG. 4B. It is desirable that the position in which an atmosphere gas is introduced be near an inlet of the soaking area (a position in which a temperature reaches the soaking temperature) if the position is in the initial part and be near an outlet of the soaking area if the position is in the latter part.

<Test 1>

In this embodiment, a test in which an atmosphere gas having a dew point (DP1) of 30 to 70° C. was introduced from the initial part of the soaking ea and a dew point (DP2) of the atmosphere gas introduced from the latter part of the soaking area was changed to −20 to 50° C. was performed, using the decarburization annealing furnace illustrated in FIG. 4B and under the treatment conditions listed in Table 1 below. Subsequently, the obtained decarburization-annealed steel sheet was subjected to a nitriding treatment under the nitriding treatment conditions listed in Table 1 and the carbon content and the oxygen content of the steel sheet which has been subjected to decarburization annealing were investigated. The carbon content in the obtained steel sheet was analyzed using an infrared absorption method by generating CO gas by burning the steel sheet in an oxygen stream. The oxygen content in a sample was analyzed using an infrared absorption method by burning the sample in a graphite crucible in an inert gas such as He to generate CO gas.

Although a magnesia water slurry may be applied to the obtained decarburization-annealed steel sheet as in the related art in some cases, in the case of this example, unevenness of the oxide layer of a surface layer occurs due to reaction with silica in the final annealing process. Thus, in this test a water slurry including an annealing separator containing alumina as a main component (for example, containing MgO: about 10 to 50%; and $Al_2O_3$: 90 to 50%) was applied.

Subsequently, the final annealing was performed, tension coating application was performed, and then magnetic domain subdivision through laser irradiation was performed to obtain a plurality of grain-oriented electrical steel sheets. The magnetic characteristics (1.7 T, iron loss W17/50 at 50 Hz and a magnetic flux density B8 at a magnetization force of 800 A/m) of these grain-oriented electrical steel sheets were measured on the basis of the Epstein method described in JISC2550-1: 2011.

TABLE 1

| Purpose of treatment | Treatment conditions | | |
|---|---|---|---|
| Cold rolling | Final thickness | (mm) | 0.23 |
| Decarburization annealing and heating | Rate of temperature rise | (° C./s) | 8 |
| | Heating time | (sec) | 80 |
| | Atmosphere | $H_2$ (%) | 75 |
| | | Dew point DP1 (° C.) | 30 to 70 |
| Decarburization annealing and soaking | Soaking temperature | (° C.) | 820 |
| | Soaking time | (sec) | 115 |
| | Atmosphere | $H_2$ (%) | 75 |
| | | Dew point DP2 (° C.) | −20 to 50 |
| Nitriding treatment | Sheet temperature at Nitriding | (° C.) | 750 |
| | Soaking time | (sec) | 33 |
| | Atmosphere | $H_2$ (%) | 75 |
| | | Dew point (° C.) | 0 |
| | | $NH_3$ (%) | 3 |

FIG. 1 illustrates a relationship between the obtained oxygen content in the steel sheet and the magnetic characteristics.

It is found from FIG. 1 that the iron loss deteriorates in all of the samples when the oxygen content in the steel sheet is more than 320 ppm. This is because, if an amount of oxidation in decarburization annealing exceeds 320 ppm, oxides (mullite) are formed during high-temperature annealing, the smoothness of the steel sheet is lost, and thus iron loss is reduced.

Figure 2:
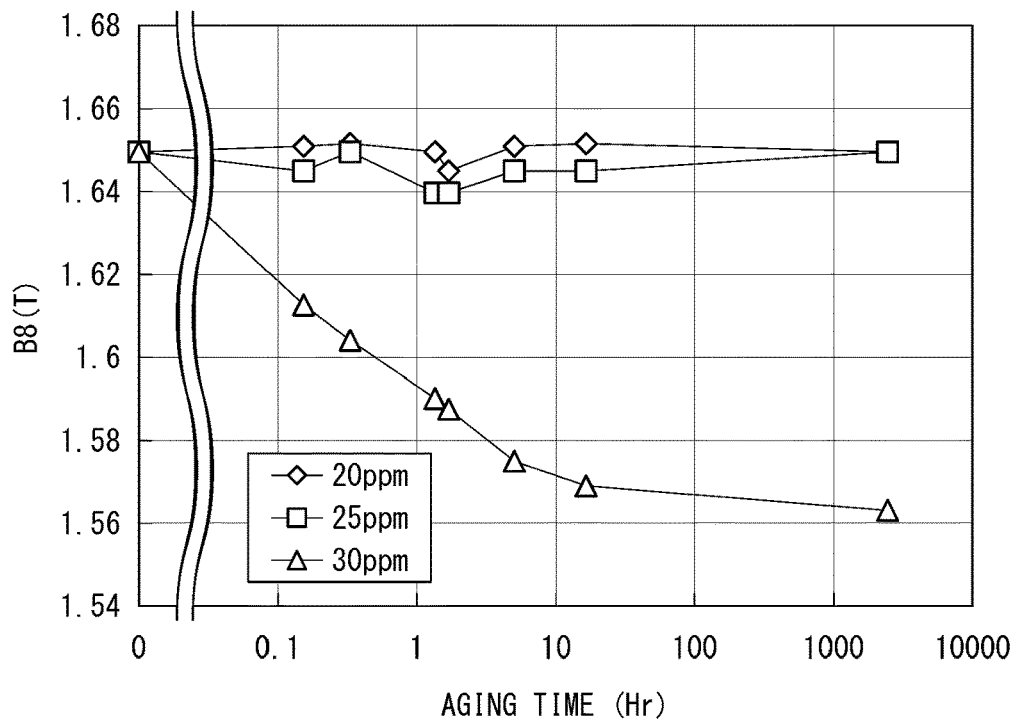
FIG. 2 is a relationship between the carbon content [C] of a steel sheet which has been subjected to decarburization annealing, an aging time of a final product, and a magnetic flux density (B8).

Also, FIG. 2 illustrates a relationship among an aging time, the carbon content in the steel sheet, and a magnetic flux density obtained after annealing is performed at 150° C. for a maximum of 10 days for holding. It is found from FIG. 2 that a coercivity sharply deteriorates in the sample having the carbon content in the steel sheet of more than 25 ppm. It is considered that this is because carbides and nitrides precipitate due to aging, which hinder the movement, of a domain wall.

Subsequently, in this embodiment, a technique for clarifying controlling factors of decarburization and an oxidation reaction and achieving both decarburization and oxidation at the tune of low dew point decarburization annealing was examined.

It is known that a decarburization reaction rate in the steel sheet is a diffusion-rate-determining rate of carbon in the steel sheet and it is known that a decarburization reaction starts at about 700° C. or higher. Thus, it is considered important to improve a decarburization temperature, a decarburization time, and a gas oxidation degree of an atmosphere gas at 700° C. or higher to improve the decarburization properties.

Figure 3:
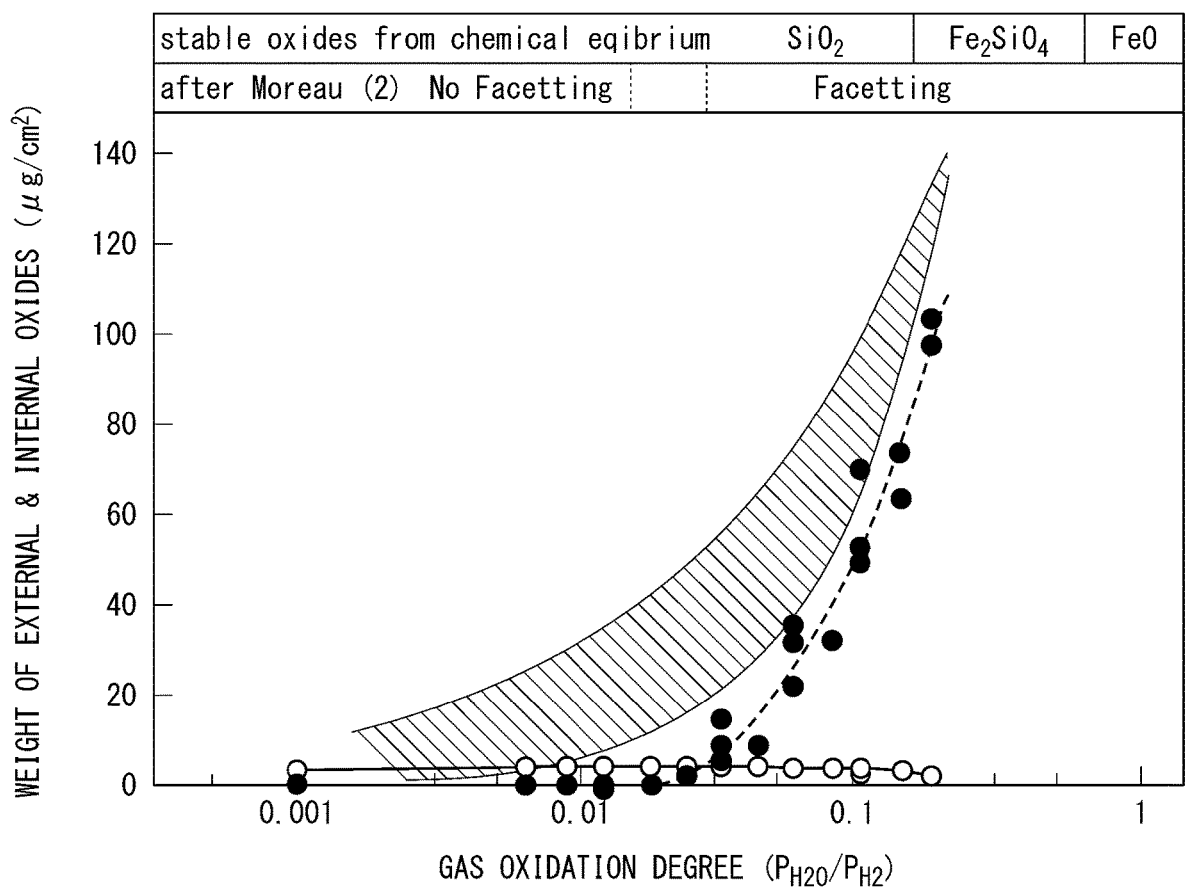
FIG. 3 is a diagram for describing an influence of an oxidation degree ($P_{H2O}/P_{H2}$) of gases on an oxide layer of a steel sheet which has been subjected to decarburization annealing.

Non-Patent document 1 describes an influence of a gas oxidation degree ($P_{H2O}/P_{H2}$) on oxidation of the steel sheet when 3% Si steel sheet is annealed at 850° C. (refer to FIG. 3). As illustrated in FIG. 3, when the gas oxidation degree ($P_{H2O}/P_{H2}$) is 0.02 (in the case of a 75% hydrogen atmosphere, a dew point corresponds to that of 18° C.) or less, the oxide formed on the surface of the steel sheet is mainly $SiO_2$. Since this $SiO_2$ is amorphous, it is known that the extremely small gas permeation effect is provided. Furthermore, $SiO_2$ is preferentially formed when annealing is performed at a low dew point in a low temperature part. Thus, it can be seen that, in order to improve decarburization, it is important to perform annealing at a relatively high dew point in an early stage of oxidation and suppress the formation of $SiO_2$.

Figure 4C:
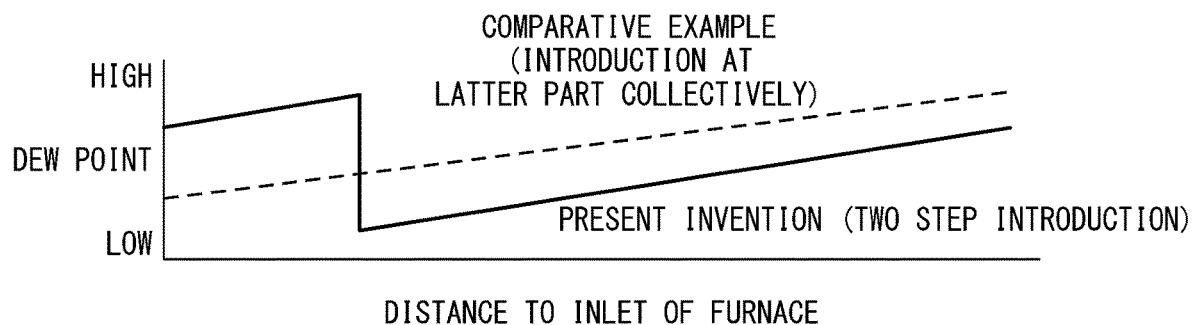
FIG. 4C is a diagram for explaining an outline of a dew point distribution of an atmosphere gas in the furnace when the decarburization annealing furnace of FIG. 4A or 4B is used.

FIG. 4C illustrates a schematic diagram of an atmosphere gas dew point distribution (the dotted line) in the decarburization annealing furnace when an atmosphere gas is introduced from the latter part of the soaking area in the furnace as illustrated in FIG. 4A and an atmosphere gas dew point distribution (the solid line) in the furnace when an atmosphere gas is introduced from the two locations which are the heating area and the soaking area as illustrated in FIG. 4B.

It can be seen that, as illustrated in FIG. 4A, when atmosphere gases are collectively introduced from the latter part of the soaking area 2, the water vapor in the atmosphere gas is consumed while the atmosphere gas is flowing from the soaking area 2 toward the heating area 1 side, and thus a dew point of an atmosphere gas introduced at the latter part of the soaking area 2 decreases toward a direction of the heating area 1 as indicated by the dotted line in FIG. 4C, This decrease in dew point promotes the formation of amorphous $SiO_2$, which makes it more difficult to achieve both decarburization and oxidation. Furthermore, since decarburization is completed when, a temperature reaches the soaking temperature, it is effective to supply an atmosphere gas having a high dew point before the temperature reaches the soaking temperature to promote decarburization.

On the other hand, when an atmosphere gas is introduced from the two locations which are the heating area and the soaking area as illustrated in FIG. 4B, it is possible to suppress the formation of the amorphous $SiO_2$ and to promote the decarburization reaction by introducing a high dew point gas at the initial part. On the other hand, it is possible to suppress excessive oxidation of Si after decarburization by introducing a low dew point gas at the latter part.

From the above consideration, it is considered in this embodiment that it is possible to achieve both decarburization and oxidation suppression through introducing of gases in two stages which are introducing of an atmosphere gas of a high dew point (DP1) to promote decarburization at an initial part (a point at which a temperature is the soaking temperature) of the soaking area 2 and introducing of an atmosphere gas of a dew point (DP2) from the latter part of the soaking area 2, as indicated by the solid line in FIG. 4B, to suppress excessive oxidation.

<Test 2>

The inventors of the present invention performed a test in which the dew point conditions during decarburization annealing are changed during annealing to promote decarburization in the heating area 1 and adjust oxidation in the soaking area 2, using a decarburization annealing furnace 10 illustrated in FIG. 4B under the treatment conditions listed in Table 2 below. The soaking temperature at the time of decarburization annealing is determined as a condition in which both decarburization and an amount of oxidation of the decarburization-annealed steel sheet are achieved and may be achieved at 800 to 870° C., preferably 805 to 850° C., and more preferably 820 to 835° C.

TABLE 2

| Purpose of treatment | Treatment conditions | | | | |
|---|---|---|---|---|---|
| Cold rolling | Final thickness | (mm) | 0.18 | 0.23 | 0.35 |
| Decarburization annealing and heating | Rate of temperature rise | (° C./s) | 13 | 8 | 7 |
| | Heating time | (sec) | 41 | 80 | 99 |
| | Atmosphere | $H_2$ (%) | 75 | 75 | 75 |
| | | Dew point DP1 (° C.) | 30 to 80 | 30 to 80 | 30 to 80 |
| Decarburization annealing and soaking | Soaking temperature | (° C.) | 820 | 820 | 820 |
| | Soaking time | (sec) | 154 | 115 | 96 |
| | Atmosphere | $H_2$ (%) | 75 | 75 | 75 |
| | | Dew point DP2 (° C.) | −20 to 50 | −20 to 50 | −20 to 50 |
| Nitriding treatment | Sheet temperature at Nitriding | (° C.) | 750 | 750 | 750 |
| | Soaking time | (sec) | 33 | 33 | 33 |
| | Atmosphere | $H_2$ (%) | 75 | 75 | 75 |
| | | Dew point (° C.) | 0 | 0 | 0 |
| | | $NH_3$ (%) | 3 | 3 | 3 |

TABLE 2-continued

| Purpose of treatment | | Treatment conditions | | | |
|---|---|---|---|---|---|
| Magnetic target | Iron loss | W17/50 (W/kg) | <0.60 | <0.70 | <0.77 |

The obtained decarburization-annealed steel sheet was subjected to the nitriding treatment annealing listed in Table 2, subjected to a final annealing after a water slurry using an annealing separator containing alumina as a main component is applied, coated with a tension coating, and then subjected to magnetic domain subdivision through laser irradiation to obtain a plurality of grain-oriented electrical steel sheets. Then, the magnetic characteristics of the plurality of grain-oriented electrical steel sheets were measured. With regard to the magnetic measurement, the iron loss W17/50 at 1.7 T and 50 Hz and the magnetic flux density B8 at the magnetization force of 800 A/m were evaluated on the basis of the Epstein method described in JISC2550-1: 2011.

Figure 5:
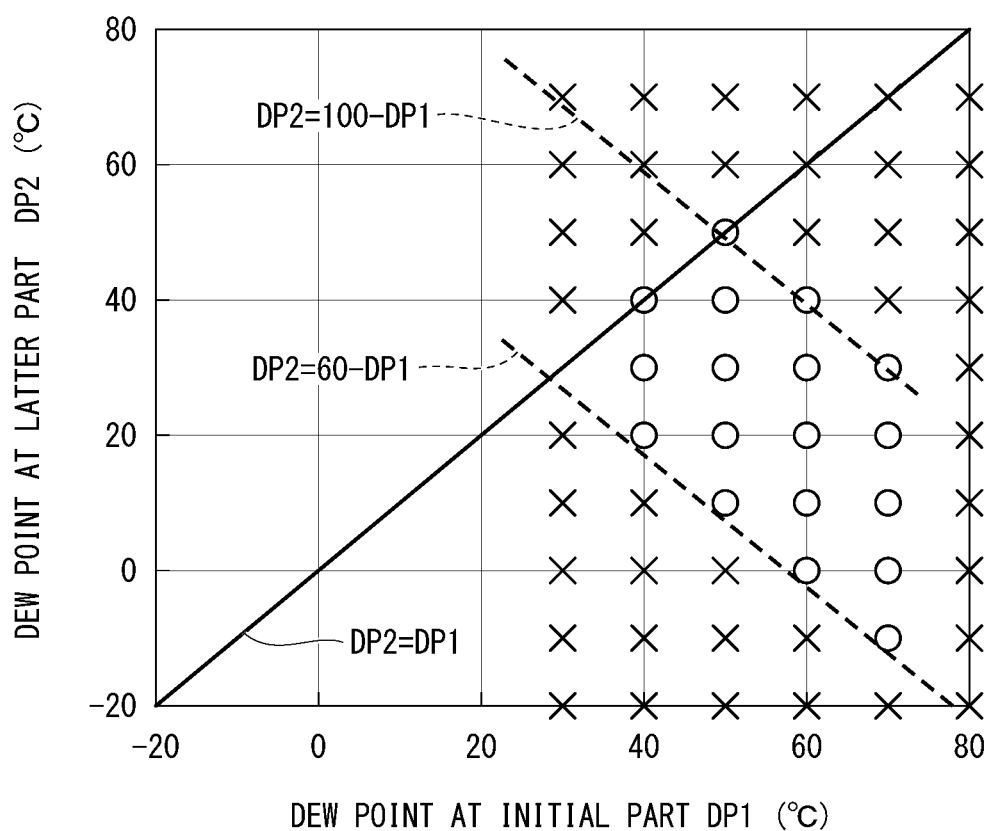
FIG. 5 is a diagram illustrating a relationship between magnetic characteristics and dew points (the dew point DP1 at the initial part and the dew point DP2 at the latter part).

The test results are shown in FIG. 5. ○ is an example in which a magnetic characteristics target x is satisfied and x is an example in which a magnetic characteristics target is not satisfied in FIG. 5. From the test results shown in FIG. 5, it was found that good magnetic characteristics can be obtained under the conditions of DP1 of 40 to 70° C., DP2≤DP1, and 60−DP1≤DP2≤100−DP1.

That is to say, when good magnetic characteristics are obtained when the oxygen content after decarburization annealing is 320 ppm or less and the carbon content is 25 ppm or less, it is desirable to perform decarburization annealing under the conditions of DP1 of 40 to 70° C., DP2≤DP1, and 60−DP1≤DP2≤100−DP1.

When DP1 is lower than 40° C., decarburizing of thick materials is difficult, and when DP1 is higher than 70° C., excessive oxidizing of thin materials occurs. For thick materials, it is more preferably 50 to 70° C., and for thin materials, it is even more preferably 40 to 60° C.

Also, when DP2>DP1 is satisfied, oxidation in the soaking area in which a sheet temperature is higher than the heating area proceeds in a state in which the progress of decarburization in the heating area is delayed, and thus, decarburization is inhibited. For this reason, it is desirable that DP2≤DP1 be satisfied.

Furthermore, when DP2 is lower than (60−DP1), decarburization after decarburization annealing is insufficient, and when DP2 is higher than (100−DP1), oxidation of thin materials is excessive. For this reason, it is desirable that DP2 be within the range of 60−DP1≤DP2≤100−DP1.

3. Final Annealing Process and Removal Process

In the final annealing process, the steel sheet is subjected to final annealing. Thus, secondary recrystallization occurs in the steel sheet.

In a normal grain-oriented electrical steel sheet, a final-annealing coating containing forsterite ($Mg_2SiO_4$) as main component is formed. Thus, generally, the surface of the decarburization-annealed steel sheet is coated with an annealing separator having a high magnesia concentration (for example, MgO≥90 mass %) and subjected to a final annealing process.

On the other hand, in the final annealing process in the method for producing a grain-oriented electrical steel sheet according to this embodiment, the surface of the decarburization-annealed steel sheet is coated with an annealing separator (for example, containing MgO: about 10 to 50 mass %; $Al_2O_3$: about 90 to 50 mass %) containing aluminum oxide having a low magnesia concentration, heated, and subjected to final annealing (cause secondary recrystallization to occur), and then undergoes the removal of the excessive annealing separator to obtain a finally-annealed steel sheet. Thus, an intermediate layer is formed so that a final-annealing coating made of forsterite ($Mg_2SiO_4$) is not formed.

Here, the annealing separator is applied to prevent seizure between steel sheets which have been subjected to final annealing and to form a final-annealing coating mad of forsterite ($Mg_2SiO_4$). In the method for producing a grain-oriented electrical steel sheet according to this embodiment, it is necessary to form an intermediate layer so that a final-annealing coating made of forsterite ($Mg_2SiO_4$) is not formed. Thus, an annealing separator having a low magnesia concentration is utilized.

The heating conditions for the final annealing may be general conditions, for example, heating is performed at a heating rate within the range of 5° C./s to 100° C./s and 1000° C. to 1300° C. for 10 hours to 50 hours.

At the time of performing cooling after the heating, it is possible to perform cooling, for example, from 1100° C. to 500° C. in an atmosphere of a gas oxidation degree ($P_{H2O}/P_{H2}$): 0.0001 to 100000.

To be more specific, in the cooling process after a temperature reaches a maximum temperature of the final annealing process, when the maximum temperature is 1100° C. or higher, T1 is set to 1100° C., when the maximum temperature is less than 1100° C. T1 is set as the maximum temperature, and a temperature range of T1 to 500° C. can be cooled in an atmosphere of a gas oxidation degree ($P_{H2O}/P_{H2}$): 0.0001 to 100000. However, the present invention is not limited by these conditions. The gas oxidation degree is preferably 0.3 to 100000.

A cooling time at which cooling is performed under the above conditions is not particularly limited, but is preferably 5 to 30 hours.

After cooling, it is possible to obtain a finally-annealed steel sheet by removing the annealing separator. Although a method for removing the annealing separator is not particularly limited, the annealing separator can be removed by performing rubbing with a brush on the surface of the base steel sheet.

4. Intermediate Layer Forming Process

In the intermediate layer forming process, for example, an intermediate layer containing silicon oxide as a main component can be formed on the surface of the finally-annealed steel sheet by heating the finally-annealed steel sheet to an upper limit temperature range exceeding 600° C. and performing annealing while holding a steel sheet in an atmosphere of a gas oxidation degree ($P_{H2O}/P_{H2}$): 0.001 to 0.04 within a temperature range of higher than 600° C. and the upper limit temperature or lower.

It is desirable that the intermediate layer be formed to the thickness described in the item of "A. Grain-oriented electrical steel sheet 2. Intermediate layer" described above.

Although the heating conditions for the finally-annealed steel sheet in the intermediate layer forming process are not particularly limited as long as they are heated to a temperature range of higher than 600° C., for example, it is desirable to hold a temperature within a temperature range of 700° C. to 1150° C. for 10 seconds to 60 seconds. From the viewpoint of a reaction rate, although a temperature needs to exceed 600° C., if the temperature is a high temperature higher than 1150° C., it may be difficult to keep a formation reaction of the intermediate layer uniform, the severe unevenness of the interface between the intermediate layer and the base steel sheet may be provided, iron loss may deteriorate, a strength of the steel sheet may decrease, and a treatment in a continuous annealing furnace may be difficult in some cases. Thus, productivity may decrease in some cases.

A holding time is preferably 10 seconds or longer from the viewpoint of forming the intermediate layer and 60 seconds or shorter from the viewpoint of productivity and avoiding a decrease in the space factor due to an increase in the thickness of the intermediate, layer.

From the viewpoint of forming the intermediate layer to a thickness of 2 to 400 nm, it is desirable to hold the intermediate layer within a temperature range of 650 to 1000° C. for 15 to 60 seconds and it is more desirable to hold the intermediate layer within a temperature range of 700 to 900° C. for 25 to 60 seconds.

5. Insulation Coating Forming Process

In the insulation coating forming process, a coating solution is applied to the surface of the intermediate layer, baked, and then heated, for example, within a temperature range of 700° C. to 1150° C. for 5 to 60 seconds in an atmosphere of 100% nitrogen gas to form an insulation coating on the surface of the intermediate layer.

It is desirable that the insulation coating be formed to have the thickness described in the term, of "A. Grain-oriented electrical steel sheet 1-3. Insulation coating" described above.

Although the coating solution is not particularly limited, a coating solution which contains colloidal silica and a coating solution which does not contain colloidal silica can be utilized properly in accordance with the application.

Examples of the coating solution which does not contain colloidal silica include a coating solution containing alumina and boric acid.

Also, examples of the coating solution containing colloidal silica include a coating solution containing phosphoric acid or phosphate, colloidal silica, and chromic anhydride or chromate. Examples of the chromate include chromate of Na, K, Ca, Sr, or the like. Colloidal silica is not particularly limited and a particle size thereof can be appropriately utilized.

Furthermore, various elements and components may be further added to the coating solution to improve various characteristics as long as the desired effect in this embodiment is not lost.

In addition, in the insulation coating forming process, heating may be performed at 650 to 950° C. in an atmosphere of a gas oxidation degree ($P_{H2O}/P_{H2}$): 0.01 to 0.30 and then annealing may be performed. Although the gas may be a generally used gas, for example, a gas consisting of hydrogen: 25 volume % and, the remainder: nitrogen and impurities can be used.

If a gas oxidation degree ($P_{H2O}/P_{H2}$) is less than 0.01 during cooling in the insulation coating forming process, there is a concern that the insulation coating is decomposed, and if the gas oxidation degree ($P_{H2O}/P_{H2}$) exceeds 0.30, there is a concern that the oxidation of the base steel sheet is significant and the iron loss deteriorates. The gas oxidation degree ($P_{H2O}/P_{H2}$) is more preferably 0.02 to 0.08, and even more preferably 0.03 to 0.05.

6. Other Processes

The method for producing a grain-oriented electrical steel sheet according to this embodiment may further include processes which are generally performed in the method for producing a grain-oriented electrical steel sheet. In addition, it is desirable that the method for producing a grain-oriented electrical steel sheet, according to this embodiment further include a nitriding treatment process of performing nitriding treatment for increasing the N content in the decarburization-annealed steel sheet between the start of decarburization annealing and the development of secondary recrystallization in final annealing. This is because a magnetic flux density can be stably improved even if a low temperature gradient provided to the steel sheet at the boundary place between a primary recrystallization region and a secondary recrystallization region is provided. Although the nitriding treatment may be a general treatment, examples of the nitriding treatment include a treatment of performing annealing in an atmosphere containing a gas having a nitriding power such as ammonia, a treatment of subjecting a decarburization-annealed steel sheet coated with an annealing separator containing powders having a nitriding effect such as MnN to final annealing, and the like.

B-2. Second Embodiment

Although the processes aimed only at forming the intermediate layer and the processes aimed only at forming the insulation coating were performed separately in the first embodiment, the second embodiment and the first embodiment differ in that, in the second embodiment, an intermediate layer and an insulation coating are formed at the same time. That is to say, the second, embodiment and the first embodiment differ in that the following intermediate layer-insulation coating forming process is performed instead of the intermediate layer forming process and the insulation coating forming process described above.

For this reason, only the intermediate layer-insulation coating forming process will be described below.

1. Intermediate Layer-Insulation Coating Forming Process

A surface of the finally-annealed steel sheet is coated with a coating solution, subjected to, for example, annealing within a temperature range of higher than 650° C. to 950° C. or lower for 5 to 300 seconds in an atmosphere of a gas oxidation degree ($P_{H2O}/P_{H2}$): 0.01 to 0.30 to form an intermediate layer and an insulation coating containing silicon oxide as a main component on the surface of the finally-annealed steel sheet at the same time.

If the surface of the finally-annealed steel sheet is coated with the coating solution and subjected to a heat treatment, the intermediate layer and a metal Fe phase are formed on the surface of the steel sheet by reducing Fe in a Fe-based oxide, and at the same time, an insulation coating is formed on the surface of the intermediate layer by baking the coating solution.

In order to simultaneously promote the formation of the intermediate layer through thermal oxidation and the formation of the insulation coating by baking the coating solution, it is more desirable to set the conditions of a gas oxidation degree ($P_{H2O}/P_{H2}$): 0.05 to 0.25 and it is even more desirable to set the conditions of a gas oxidation degree ($P_{H2O}/P_{H2}$): 0.10 to 0.20.

The present invention is not limited to the above-described embodiments. The above-described embodiments are examples and anything having substantially the same Constitution as the technical idea described in the claims of the present invention and exhibiting the same action and effect is included in the technical scope of the present invention.

EXAMPLES

The present invention will be described in detail below by with reference to examples. In the following description, the conditions in the examples are one condition example adopted for confirming the feasibility and effect of the present invention and the present invention is not limited to this one condition example. In the present, invention, various conditions can be adopted as long as the gist of the present invention is not deviated and the object of the present invention is achieved.

Example 1

"In a Case that Sheet Thickness is 0.18 mm"

A slab having a chemical composition in which Si: 3.45%; C: 0.060%; acid-soluble Al: 0.030%: N: 0.008%; Mn: 0.10%; a total amount of S and Se: 0.007%; and the remainder: Fe and impurities were contained was subjected to soaking at 1150° C. for 60 minutes and then the slab which has been subjected to heating was subjected to hot rolling to obtain a hot-rolled steel sheet having a sheet thickness of 2.8 mm. Subsequently, the hot-rolled steel sheet was subjected to hot-band annealing, in which the hot-rolled steel sheet was held at 900° C. for 120 seconds and then rapidly cooled, to obtain an annealed steel sheet. Subsequently, the annealed steel sheet was pickled and then the pickled steel sheet was subjected to one or more cold rollings to obtain a cold-rolled steel sheet having a final sheet thickness of 0.18 mm.

As shown in Table 3, decarburization annealing in which a soaking temperature was set to 820 to 835° C. and an atmosphere gas was introduced from two locations which were an initial part and a latter part in the soaking area was performed using the cold-rolled steel sheet made of this thin material (a sheet thickness of 0.18 mm). At that time, a dew point DP1 of an atmosphere gas introduced from the initial part was changed to 30 to 80° C. and a dew point DP2 of an, atmosphere gas introduced from the latter part was changed to −5 to 55° C. The target carbon content [C] was 25 ppm or less and the target oxygen content [0] was 320 ppm or less.

The carbon content after decarburization annealing was analyzed using an infrared absorption method by burning a sample in an oxygen stream to generate CO gas. With regard to the oxygen content, a sample in a graphite crucible in an inert gas such as He was burned to generate CO gas and the CO gas was analyzed using an infrared absorption method.

After decarburization annealing, an annealing separator containing alumina as a main component which does not easily react with silica was coated in a water slurry state and then subjected to final annealing. The final annealing was performed up to 1200° C. in an atmosphere gas of $N_2$: 25%+$H_2$: 75% at a rate of temperature rise of 15° C./Hr, the atmosphere gas was changed to Hz: 100% at 1200° C. and annealing was performed for 20 hours. During cooling after the heating, for example, cooling was performed from 1100° C. to 500° C. in an atmosphere of a gas oxidation degree ($P_{H2O}/P_{H2}$): 0.0001 to 100000. Furthermore, a cooling time at which cooling was performed under the above conditions was 5 to 30 hours.

The powder of the annealing separator on these steel sheets which has been subjected to final annealing was removed with a brush and some of the steel sheets was annealed at 870° C. in, an atmosphere in which an atmosphere gas oxidation degree ($P_{H2O}/P_{H2}$) was 0.01 for 60 seconds to form an intermediate layer having a thickness of 20 nm. The steel sheets were cooled, coated with a coating solution, and then annealed at 840° C. in an atmosphere in which an atmosphere gas oxidation degree ($P_{H2O}/P_{H2}$) was 0.03 for 60 seconds to form an insulation coating having an amount of adhesion after baking of 4.5 g/m$^2$ and a thickness of 2 urn.

Also, other, steel sheets were coated with a coating solution, dried at 450° C., and then annealed at 840° C. in an atmosphere in which an atmosphere gas oxidation degree ($P_{H2O}/P_{H2}$) was 0.10 for 60 seconds to form an intermediate layer having a thickness of 20 nm and an insulation coating having an amount of adhesion after baking of 4.5 g/m$^2$ and a thickness of 2 μm.

Finally, linear grooves extending in a direction intersecting a rolling direction were subjected to a magnetic domain subdivision treatment using a laser to have prescribed intervals.

After that, the obtained grain-oriented electrical steel sheet was subjected to magnetic measurement. With regard to the magnetic measurement, the iron loss W17/50 at 1.7 T and 50 Hz and the magnetic flux density B8 at a magnetization force of 800 A/m were evaluated on the basis of the Epstein method described in JISC2550-1: 2011. The evaluation of the magnetic characteristics was determined to be good when the iron loss W17/50 was less than 0.60 W/kg and the magnetic flux density is more than 1.60 T.

The test results are shown in Table 3 below.

TABLE 3

| | Decarburization annealing condition | | | | | | Steel sheet which has been subjected to decarburization annealing | | Magnetic characteristics | | |
|---|---|---|---|---|---|---|---|---|---|---|---|
| Heating | | Soaking | | | | | | | | | |
| | | | | Dew point | | | | | B8(T) | | |
| | Dew point DP 1 at initial | Soaking sheet temperature | Soaking time | DP 2 at latter part | Range of dew point DP2 at latter part | | Oxygen content [O] | Carbon content [C] | | After | |
| Rate of temperature rise (° C./s) | part (° C.) | (° C.) | (sec) | (° C.) | Lower limit (60 − DP1) | Upper limit (100 − DP1) | (ppm) | (ppm) | W17/50 (W/kg) | 100 Hr aging | Remarks |
| 13.2 | 30 | 820 | 154 | 15 | 30 | 70 | 25 | 137 | 0.53 | 1.42 | Comparative Example 1 |
| 13.2 | 30 | 820 | 154 | 20 | 30 | 70 | 57 | 118 | 0.55 | 1.43 | Comparative Example 2 |

TABLE 3-continued

| | Decarburization annealing condition | | | | | | Steel sheet which has been subjected to decarburization annealing | | Magnetic characteristics | | |
|---|---|---|---|---|---|---|---|---|---|---|---|
| Heating | | Soaking | | | | | | | | | |
| | Dew point | | | Dew point | | | | | | | |
| Rate of temperature rise (° C./s) | DP 1 at initial part (° C.) | Soaking sheet temperature (° C.) | Soaking time (sec) | DP 2 at latter part (° C.) | Range of dew point DP2 at latter part | | Oxygen content [O] (ppm) | Carbon content [C] (ppm) | W17/50 (W/kg) | B8(T) After 100 Hr aging | Remarks |
| | | | | | Lower limit (60 − DP1) | Upper limit (100 − DP1) | | | | | |
| 13.2 | 30 | 820 | 154 | 30 | 30 | 70 | 183 | 99 | 0.56 | 1.45 | Comparative Example 3 |
| 13.2 | 30 | 820 | 154 | 40 | 30 | 70 | 214 | 80 | 0.54 | 1.48 | Comparative Example 4 |
| 13.2 | 30 | 820 | 154 | 45 | 30 | 70 | 227 | 61 | 0.55 | 1.51 | Comparative Example 5 |
| 13.2 | 40 | 820 | 154 | 15 | 20 | 60 | 125 | 42 | 0.53 | 1.56 | Comparative Example 6 |
| 13.2 | 40 | 820 | 154 | 20 | 20 | 60 | 157 | 23 | 0.56 | 1.63 | Present Invention Example 1 |
| 13.2 | 40 | 820 | 154 | 30 | 20 | 60 | 283 | 19 | 0.55 | 1.66 | Present Invention Example 2 |
| 13.2 | 40 | 820 | 154 | 40 | 20 | 60 | 314 | 8 | 0.54 | 1.65 | Present Invention Example 3 |
| 13.2 | 40 | 820 | 154 | 45 | 20 | 60 | 327 | 4 | 0.63 | 1.65 | Comparative Example 7 |
| 13.2 | 50 | 820 | 154 | 5 | 10 | 50 | 275 | 36 | 0.55 | 1.58 | Comparative Example 8 |
| 13.2 | 50 | 820 | 154 | 10 | 10 | 50 | 280 | 25 | 0.54 | 1.62 | Present Invention Example 4 |
| 13.2 | 50 | 820 | 154 | 20 | 10 | 50 | 293 | 19 | 0.56 | 1.65 | Present Invention Example 5 |
| 13.2 | 50 | 820 | 154 | 30 | 10 | 50 | 304 | 10 | 0.55 | 1.64 | Present Invention Example 6 |
| 13.2 | 50 | 820 | 154 | 40 | 10 | 50 | 313 | 5 | 0.56 | 1.65 | Present Invention Example 7 |
| 13.2 | 50 | 820 | 154 | 50 | 10 | 50 | 319 | 0 | 0.59 | 1.64 | Present Invention Example 8 |
| 13.2 | 50 | 820 | 154 | 55 | 10 | 50 | 330 | 1 | 0.65 | 1.65 | Comparative Example 9 |
| 13.2 | 50 | 835 | 154 | 5 | 10 | 50 | 295 | 26 | 0.55 | 1.59 | Comparative Example 10 |
| 13.2 | 50 | 835 | 154 | 10 | 10 | 50 | 300 | 13 | 0.56 | 1.64 | Present Invention Example 9 |
| 13.2 | 50 | 835 | 154 | 20 | 10 | 50 | 313 | 7 | 0.59 | 1.64 | Present Invention Example 10 |
| 13.2 | 50 | 835 | 154 | 30 | 10 | 50 | 324 | 1 | 0.65 | 1.65 | Comparative Example 11 |
| 13.2 | 50 | 835 | 154 | 40 | 10 | 50 | 333 | 0 | 0.67 | 1.65 | Comparative Example 12 |
| 13.2 | 50 | 835 | 154 | 50 | 10 | 50 | 339 | 2 | 0.69 | 1.65 | Comparative Example 13 |
| 13.2 | 50 | 835 | 154 | 55 | 10 | 50 | 350 | 0 | 0.72 | 1.64 | Comparative Example 14 |
| 13.2 | 60 | 820 | 154 | −5 | 0 | 40 | 143 | 38 | 0.56 | 1.57 | Comparative Example 15 |
| 13.2 | 60 | 820 | 154 | 0 | 0 | 40 | 157 | 24 | 0.55 | 1.63 | Present Invention Example 11 |
| 13.2 | 60 | 820 | 154 | 10 | 0 | 40 | 205 | 10 | 0.56 | 1.64 | Present Invention Example 12 |
| 13.2 | 60 | 820 | 154 | 20 | 0 | 40 | 250 | 5 | 0.54 | 1.65 | Present Invention Example 13 |

TABLE 3-continued

| | Decarburization annealing condition | | | | | | Steel sheet which has been subjected to decarburization annealing | | Magnetic characteristics | | |
|---|---|---|---|---|---|---|---|---|---|---|---|
| Heating | | Soaking | | | | | | | | | |
| | Dew point | | | Dew point | | | | | | | |
| Rate of temperature rise (° C./s) | DP 1 at initial part (° C.) | Soaking sheet temperature (° C.) | Soaking time (sec) | DP 2 at latter part (° C.) | Range of dew point DP2 at latter part | | Oxygen content [O] (ppm) | Carbon content [C] (ppm) | W17/50 (W/kg) | B8(T) After 100 Hr aging | Remarks |
| | | | | | Lower limit (60 − DP1) | Upper limit (100 − DP1) | | | | | |
| 13.2 | 60 | 820 | 154 | 30 | 0 | 40 | 287 | 2 | 0.57 | 1.65 | Present Invention Example 14 |
| 13.2 | 60 | 820 | 154 | 40 | 0 | 40 | 318 | 0 | 0.58 | 1.65 | Present Invention Example 15 |
| 13.2 | 60 | 820 | 154 | 45 | 0 | 40 | 330 | 1 | 0.68 | 1.64 | Comparative Example 16 |
| 13.2 | 80 | 820 | 154 | −5 | −20 | 20 | 323 | 0 | 0.62 | 1.65 | Comparative Example 17 |
| 13.2 | 80 | 820 | 154 | 0 | −20 | 20 | 337 | 0 | 0.68 | 1.64 | Comparative Example 18 |
| 13.2 | 80 | 820 | 154 | 10 | −20 | 20 | 351 | 0 | 0.72 | 1.66 | Comparative Example 19 |
| 13.2 | 80 | 820 | 154 | 20 | −20 | 20 | 365 | 0 | 0.79 | 1.62 | Comparative Example 20 |
| 13.2 | 80 | 820 | 154 | 30 | −20 | 20 | 379 | 0 | 0.75 | 1.63 | Comparative Example 21 |
| 13.2 | 80 | 820 | 154 | 40 | −20 | 20 | 393 | 0 | 0.81 | 1.64 | Comparative Example 22 |
| 13.2 | 80 | 820 | 154 | 45 | −20 | 20 | 407 | 0 | 0.86 | 1.65 | Comparative Example 23 |

Although thin materials have better decarburization properties than those of thick materials and the thin materials have the easy progress of oxidation. Thus, good magnetic characteristics could not be obtained when the dew point DP1 at the initial part was at 30° C. and 80° C.

Also, as shown in Table 3, in the example of the present invention, in the steel sheet which has been subjected to decarburization annealing, a decarburization-annealed steel sheet having the oxygen content of 320 ppm or less and the carbon content of 25 ppm or less could be obtained. Particularly, when the dew point DP1 of an atmosphere gas introduced from the initial part in the soaking area was set to 40 to 70° C. and the dew point DP2 of an atmosphere gas introduced from the latter part in the soaking area satisfied DP2≤DP1 and 60−DP1≤DP2≤100−DP1, a decarburization-annealed steel sheet having the oxygen content of 320 ppm or less and the carbon content of 25 ppm or less could be obtained. Furthermore, grain-oriented electrical steel sheets obtained by forming an intermediate layer and an insulation layer using these decarburization-annealed steel sheets were excellent electrical steel sheets having low iron loss. Furthermore, in all cases, a sufficient coating adhesion was provided.

Example 2

"In a Case that Sheet Thickness is 0.23 mm"

A slab having a chemical composition in which Si: 3.45%; C: 0.060%; acid-soluble Al: 0.030%; N: 0.008%©; Mn: 0.10%; a total amount of S and Se: 0.007%; and the remainder: Fe and impurities were contained was subjected to soaking at 1150° C. for 60 minutes and then the slab which has been subjected to heating was subjected to hot rolling to obtain a hot-rolled steel sheet having a sheet thickness of 2.8 mm.

Subsequently, the hot-rolled steel sheet was subjected to hot-band annealing in which the hot-rolled steel sheet was held at 900° C. for 120 seconds and then rapidly cooled, to obtain an annealed steel sheet. Subsequently, the annealed steel sheet was pickled and then the pickled steel sheet was subjected to one or more cold rollings to obtain a cold-rolled steel sheet having a final sheet thickness of 0.23 mm.

Decarburization annealing in which a soaking temperature was set to 820 to 840° C., a dew point DP1 at an initial part was changed to 30 to 80° C., and a dew point DP2 at a latter part was changed to −15 to 55° C. was performed using a cold-rolled steel sheet having a thick material of 0.23 mm.

After decarburization annealing, an annealing separator containing alumina as a main component which does not easily react with silica was coated in a water slurry state and then subjected to final annealing. The final annealing was performed up to 1200° C. in an atmosphere gas of $N_2$: 25%+$H_2$: 75% at a rate of temperature rise of 15° C./Hr, the atmosphere gas was changed to Hz: 100% at 1200° C. and annealing was performed for 20 hours. During cooling after the heating, cooling was performed from 1100° C. to 500° C. in an atmosphere of a gas oxidation degree ($P_{H2O}/P_{H2}$): 0.0001 to 100000. Furthermore, a cooling time at which cooling was performed under the above conditions was 5 to 30 hours.

The powder of the annealing separator on these steel sheets which has been subjected to final annealing was removed with a brush and some of the steel sheets was annealed at 870° C. in an atmosphere in which an atmosphere gas oxidation degree ($P_{H2O}/P_{H2}$) was 0.010 for 60 seconds to form an intermediate layer having a thickness of 20 nm. The steel sheets were cooled, coated with a coating solution, and then annealed at 840° C. in an atmosphere in which an atmosphere gas oxidation degree ($P_{H2O}/P_{H2}$) was 0.01 for 60 seconds to form an insulation coating having an amount of adhesion after baking of 4.5 g/m² and a thickness of 2 μm. Furthermore, other steel sheets were annealed at 870° C. for 60 seconds in an atmosphere in which an atmosphere gas oxidation degree ($P_{H2O}/P_{H2}$) was 0.10 to form an intermediate layer having a thickness of 20 nm and an insulation coating having an amount of adhesion after baking of 4.5 g/m² and a thickness of 2 μm.

Finally, linear grooves extending in a direction intersecting a rolling direction were subjected to a magnetic domain subdivision treatment using a laser to have prescribed intervals.

After that, the obtained grain-oriented electrical steel sheet was subjected to magnetic measurement. With regard to the magnetic measurement, the iron loss W17/50 at 1.7 T and 50 Hz and the magnetic flux density B8 at a magnetization force of 800 Atm were evaluated on the basis of the Epstein method described in JISC2550-1: 2011.

The evaluation of the magnetic characteristics was determined to be good when the iron loss W17/50 was less than 0.70 W/kg and the magnetic flux density is more than 1.60 T. The test results are shown in Table 4 below.

| Decarburization annealing condition | | | | | | Steel sheet which has been subjected to decarburization annealing | | Magnetic characteristics | | | |
|---|---|---|---|---|---|---|---|---|---|---|---|
| Heating | | Soaking | | | | | | | | | |
| Rate of temperature rise (° C./s) | Dew point DP 1 at initial part (° C.) | Soaking sheet temperature (° C.) | Soaking time (sec) | Dew point DP 2 at latter part(° C.) | Range of dew point DP2 at latter part | | Oxygen content [O] (ppm) | Carbon content [C] (ppm) | W17/50 (W/kg) | B8(T) After 100 Hr aging | Remarks |
| | | | | | Lower limit (60 − DP1) | Upper limit (100 − DP1) | | | | | |
| 8 | 30 | 820 | 154 | 15 | 30 | 70 | 20 | 127 | 0.65 | 1.43 | Comparative Example 24 |
| 8 | 30 | 820 | 154 | 20 | 30 | 70 | 52 | 110 | 0.66 | 1.44 | Comparative Example 25 |
| 8 | 30 | 820 | 154 | 30 | 30 | 70 | 178 | 93 | 0.64 | 1.46 | Comparative Example 26 |
| 8 | 30 | 820 | 154 | 40 | 30 | 70 | 209 | 76 | 0.68 | 1.49 | Comparative Example 27 |
| 8 | 30 | 820 | 154 | 45 | 30 | 70 | 222 | 59 | 0.65 | 1.52 | Comparative Example 28 |
| 8 | 40 | 820 | 154 | 15 | 20 | 60 | 120 | 42 | 0.65 | 1.56 | Comparative Example 29 |
| 8 | 40 | 820 | 154 | 20 | 20 | 60 | 152 | 25 | 0.64 | 1.62 | Present Invention Example 16 |
| 8 | 40 | 820 | 154 | 30 | 20 | 60 | 278 | 14 | 0.66 | 1.64 | Present Invention Example 17 |
| 8 | 40 | 820 | 154 | 40 | 20 | 60 | 309 | 5 | 0.69 | 1.64 | Present Invention Example 18 |
| 8 | 40 | 820 | 154 | 45 | 20 | 60 | 322 | 1 | 0.74 | 1.65 | Comparative Example 30 |
| 8 | 50 | 820 | 115 | 5 | 10 | 50 | 163 | 31 | 0.64 | 1.60 | Comparative Example 31 |
| 8 | 50 | 820 | 115 | 10 | 10 | 50 | 195 | 24 | 0.63 | 1.63 | Present Invention Example 19 |
| 8 | 50 | 820 | 115 | 20 | 10 | 50 | 240 | 15 | 0.68 | 1.65 | Present Invention Example 20 |
| 8 | 50 | 820 | 115 | 30 | 10 | 50 | 280 | 8 | 0.64 | 1.64 | Present Invention Example 21 |
| 8 | 50 | 820 | 115 | 40 | 10 | 50 | 310 | 2 | 0.69 | 1.64 | Present Invention Example 22 |
| 8 | 50 | 820 | 115 | 50 | 10 | 50 | 320 | 0 | 0.66 | 1.65 | Present Invention Example 23 |
| 8 | 50 | 820 | 115 | 55 | 10 | 50 | 333 | 0 | 0.78 | 1.65 | Comparative Example 32 |
| 8 | 50 | 840 | 115 | 5 | 10 | 50 | 198 | 26 | 0.65 | 1.58 | Comparative Example 33 |
| 8 | 50 | 840 | 115 | 10 | 10 | 50 | 230 | 19 | 0.64 | 1.65 | Present Invention Example 24 |
| 8 | 50 | 840 | 115 | 20 | 10 | 50 | 275 | 10 | 0.67 | 1.64 | Present Invention Example 25 |
| 8 | 50 | 840 | 115 | 30 | 10 | 50 | 315 | 2 | 0.65 | 1.65 | Present Invention Example 26 |

|  | Decarburization annealing condition | | | | | | Steel sheet which has been subjected to decarburization annealing | | Magnetic characteristics | | |
|---|---|---|---|---|---|---|---|---|---|---|---|
| Heating | | Soaking | | | | | | | | | |
| | Dew point DP 1 at initial | Soaking sheet | Soaking | Dew point DP 2 at latter | Range of dew point DP2 at latter part | | Oxygen content [O] | Carbon content [C] | W17/50 | B8(T) After 100 Hr | |
| Rate of temperature rise (° C./s) | part (° C.) | temperature (° C.) | time (sec) | part(° C.) | Lower limit (60 − DP1) | Upper limit (100 − DP1) | (ppm) | (ppm) | (WZkg) | aging | Remarks |
| 8 | 50 | 840 | 115 | 40 | 10 | 50 | 345 | 1 | 0.72 | 1.65 | Comparative Example 34 |
| 8 | 50 | 840 | 115 | 50 | 10 | 50 | 355 | 0 | 0.78 | 1.65 | Comparative Example 35 |
| 8 | 50 | 840 | 115 | 55 | 10 | 50 | 368 | 3 | 0.78 | 1.64 | Comparative Example 36 |
| 8 | 60 | 820 | 115 | −5 | 0 | 40 | 199 | 32 | 0.65 | 1.59 | Comparative Example 37 |
| 8 | 60 | 820 | 115 | 0 | 0 | 40 | 217 | 24 | 0.64 | 1.63 | Present Invention Example 29 |
| 8 | 60 | 820 | 115 | 10 | 0 | 40 | 250 | 17 | 0.65 | 1.65 | Present Invention Example 30 |
| 8 | 60 | 820 | 115 | 20 | 0 | 40 | 288 | 8 | 0.66 | 1.64 | Present Invention Example 31 |
| 8 | 60 | 820 | 115 | 30 | 0 | 40 | 311 | 3 | 0.64 | 1.64 | Present Invention Example 32 |
| 8 | 60 | 820 | 115 | 40 | 0 | 40 | 320 | 1 | 0.68 | 1.64 | Present Invention Example 33 |
| 8 | 60 | 820 | 115 | 45 | 0 | 40 | 326 | 0 | 0.77 | 1.65 | Comparative Example 38 |
| 8 | 70 | 820 | 115 | −15 | −10 | 30 | 134 | 38 | 0.65 | 1.57 | Comparative Example 39 |
| 8 | 70 | 820 | 115 | −10 | −10 | 30 | 170 | 25 | 0.64 | 1.62 | Present Invention Example 34 |
| 8 | 70 | 820 | 115 | 0 | −10 | 30 | 228 | 16 | 0.65 | 1.65 | Present Invention Example 35 |
| 8 | 70 | 820 | 115 | 10 | −10 | 30 | 260 | 9 | 0.66 | 1.65 | Present Invention Example 36 |
| 8 | 70 | 820 | 115 | 20 | −10 | 30 | 299 | 3 | 0.64 | 1.64 | Present Invention Example 37 |
| 8 | 70 | 820 | 115 | 30 | −10 | 30 | 320 | 0 | 0.68 | 1.65 | Present Invention Example 38 |
| 8 | 70 | 820 | 115 | 35 | −10 | 30 | 330 | 1 | 0.77 | 1.64 | Comparative Example 40 |
| 8 | 80 | 820 | 115 | −15 | −20 | 20 | 326 | 0 | 0.72 | 1.65 | Comparative Example 41 |
| 8 | 80 | 820 | 115 | −10 | −20 | 20 | 362 | 0 | 0.76 | 1.65 | Comparative Example 42 |
| 8 | 80 | 820 | 115 | 0 | −20 | 20 | 398 | 0 | 0.79 | 1.64 | Comparative Example 43 |
| 8 | 80 | 820 | 115 | 10 | −20 | 20 | 434 | 0 | 0.77 | 1.65 | Comparative Example 44 |
| 8 | 80 | 820 | 115 | 20 | −20 | 20 | 470 | 0 | 0.82 | 1.64 | Comparative Example 45 |
| 8 | 80 | 820 | 115 | 30 | −20 | 20 | 506 | 0 | 0.85 | 1.64 | Comparative Example 46 |
| 8 | 80 | 820 | 115 | 35 | −20 | 20 | 542 | 0 | 0.92 | 1.64 | Comparative Example 47 |

As shown in the test results in Table 4, the conditions for achieving both oxidation and decarburization are wider than those of the steel sheets having the sheet thicknesses listed in Table 3 and there were the conditions in which good magnetic characteristics could be obtained when the dew point DP1 at the initial part was set to 40 to 70° C.

As shown in Table 4, in the example of the present invention, in the steel sheet which has been subjected to decarburization annealing, the decarburization-annealed steel sheet having the oxygen content of 320 ppm or less and the carbon content of 25 ppm or less could be obtained. Furthermore, the grain-oriented electrical steel sheet obtained by forming the intermediate layer and the insulation layer using these decarburization-annealed steel sheets was an excellent electrical steel sheet, having low iron loss.

Also, it was found that, when a relationship of DP2≤DP1 and 60−DP1≤DP2≤100−DP1 is satisfied, an excellent grain-oriented electrical steel sheet having the oxygen content of 320 ppm or less and the carbon content of 25 ppm or less and low iron loss could be obtained even with a steel sheet having a thickness of 0.23 mm thicker than 0.18 mm.

Example 3

"In a Case that Sheet Thickness is 0.35 mm"

A slab having a chemical composition in which Si: 3.25%; C; 0.050%; acid-soluble Al: 0.030%; N: 0.008%; Mn: 0.10%©, a total amount of S and Se: 0.006%; and the remainder: Fe and impurities were contained was subjected to soaking at 1150° C. for 60 minutes and then the slab which has been subjected to heating was subjected to hot rolling to obtain a hot-rolled steel sheet having a sheet thickness of 2.8 mm.

Subsequently, the hot-rolled steel sheet was subjected to hot-band annealing in which the hot-rolled steel sheet was held at 900° C. for 120 seconds and then rapidly cooled, to obtain an annealed steel sheet. Subsequently, the annealed steel sheet was pickled and then the pickled steel sheet was subjected to one or more cold rollings to obtain a cold-rolled steel sheet having a final sheet thickness of 0.35 mm.

Decarburization annealing in which a soaking temperature was set to 820 to 840° C., a dew point DP1 at an initial part was changed to 30 to 80° C., and a dew point DP2 at a latter part was changed to −15 to 55° C. was performed using a cold-rolled steel sheet made of a thick material (a sheet thickness of 0.35 mm).

After annealing, an annealing separator containing alumina as a main component which does not easily react with silica was coated in a water slurry state and then subjected to final annealing. The final, annealing was performed up to 1200° C. in an atmosphere gas of $N_2$: 25%+$H_2$: 75% at a rate of temperature rise of 15° C./Hr, the atmosphere gas was changed to $H_2$: 100% at 1200° C., and annealing was performed for 20 hours.

During cooling after the heating, for example, cooling was performed from 1100° C. to 500° C. in an atmosphere of a gas oxidation degree ($P_{H2O}/P_{H2}$): 0.0001 to 100000. Furthermore, a cooling time at which cooling was performed under the above conditions was 5 to 30 hours.

The powder of the annealing separator on these samples was removed with a brush and some of the steel sheets was annealed at 870° C. in an atmosphere in which an atmosphere gas oxidation degree ($P_{H2O}/P_{H2}$) was 0.01 for 60 seconds to form an intermediate layer having a thickness of 20 nm. The steel sheets were cooled, coated with a coating solution, and then annealed at 840° C. in an atmosphere in which an atmosphere gas oxidation degree ($P_{H2O}/P_{H2}$) was 0.01 for 60 seconds to form an insulation coating having an amount of adhesion after baking of 4.5 g/m² and a thickness of 2 μm. Furthermore, other steel sheets were coated with an insulation coating, dried at 450° C. and then annealed at 840° C. in an atmosphere in which an atmosphere gas oxidation degree ($P_{H2O}/P_{H2}$) was 0.10 for 60 seconds to form an intermediate layer having a thickness of 20 nm and an insulation coating having an amount of adhesion after baking of 4.5 g/m² and a thickness of 2 μm at the same time.

Finally, linear grooves extending in a direction intersecting a rolling direction were subjected to a magnetic domain subdivision treatment using a laser to have prescribed intervals.

After that, the obtained grain-oriented electrical steel sheet was subjected to magnetic measurement. The evaluation of the magnetic characteristics was determined to be good when the iron loss W17/50 was less than 0.77 W/kg and the magnetic flux density is more than 1.60 T.

The test results are shown in Table 5 below.

TABLE 5

| Decarburization annealing condition | | | | | | | Steel sheet which has been subjected to decarburization annealing | | Magnetic characteristics | | |
|---|---|---|---|---|---|---|---|---|---|---|---|
| Heating | Soaking | | | | | | | | | | |
| Rate of temperature rise (° C./s) | Dew point DP 1 at initial part (° C.) | Soaking sheet temperature (° C.) | Soaking time (sec) | Dew point DP 2 at latter part (° C.) | Range of dew point DP2 at latter part | | Oxygen content [O] (ppm) | Carbon content [C] (ppm) | W17/50 (W/kg) | B8(T) After 100 Hr aging | Remarks |
| | | | | | Lower limit (60 − DP1) | Upper limit (100 − DP1) | | | | | |
| 6.7 | 30 | 820 | 96 | 5 | 30 | 70 | 115 | 97 | 0.77 | 1.46 | Comparative Example 48 |
| 6.7 | 30 | 820 | 96 | 10 | 30 | 70 | 119 | 88 | 0.79 | 1.47 | Comparative Example 49 |
| 6.7 | 30 | 820 | 96 | 20 | 30 | 70 | 160 | 79 | 0.78 | 1.48 | Comparative Example 50 |
| 6.7 | 30 | 820 | 96 | 30 | 30 | 70 | 190 | 70 | 0.75 | 1.49 | Comparative Example 51 |
| 6.7 | 30 | 820 | 96 | 40 | 30 | 70 | 208 | 61 | 0.77 | 1.51 | Comparative Example 52 |
| 6.7 | 30 | 820 | 96 | 50 | 30 | 70 | 215 | 52 | 0.77 | 1.53 | Comparative Example 53 |
| 6.7 | 30 | 820 | 96 | 55 | 30 | 70 | 219 | 43 | 0.78 | 1.55 | Comparative Example 54 |
| 6.7 | 50 | 820 | 96 | 5 | 10 | 50 | 260 | 34 | 0.73 | 1.58 | Comparative Example 62 |
| 6.7 | 50 | 820 | 96 | 10 | 10 | 50 | 290 | 25 | 0.76 | 1.62 | Present Invention Example 39 |

TABLE 5-continued

| Decarburization annealing condition | | | | | | Steel sheet which has been subjected to decarburization annealing | | Magnetic characteristics | | |
|---|---|---|---|---|---|---|---|---|---|---|
| Heating | Soaking | | | | | | | | | |
| | Dew point | | | Dew point | | | | | | |
| Rate of temperature rise (° C./s) | DP 1 at initial part (° C.) | Soaking sheet temperature (° C.) | Soaking time (sec) | DP 2 at latter part (° C.) | Range of dew point DP2 at latter part | | Oxygen content [O] (ppm) | Carbon content [C] (ppm) | W17/50 (W/kg) | B8(T) After 100 Hr aging | Remarks |
| | | | | | Lower limit (60 − DP1) | Upper limit (100 − DP1) | | | | | |
| 6.7 | 50 | 820 | 96 | 20 | 10 | 50 | 308 | 21 | 0.74 | 1.65 | Present Invention Example 40 |
| 6.7 | 50 | 820 | 96 | 30 | 10 | 50 | 315 | 18 | 0.75 | 1.64 | Present Invention Example 41 |
| 6.7 | 50 | 820 | 96 | 40 | 10 | 50 | 319 | 15 | 0.73 | 1.64 | Present Invention Example 42 |
| 6.7 | 50 | 820 | 96 | 50 | 10 | 50 | 320 | 12 | 0.76 | 1.65 | Present Invention Example 43 |
| 6.7 | 50 | 820 | 96 | 55 | 10 | 50 | 329 | 9 | 0.90 | 1.64 | Comparative Example 63 |
| 6.7 | 50 | 840 | 96 | 5 | 10 | 50 | 292 | 29 | 0.73 | 1.60 | Comparative Example 64 |
| 6.7 | 50 | 840 | 96 | 10 | 10 | 50 | 322 | 20 | 0.78 | 1.65 | Comparative Example 65 |
| 6.7 | 50 | 840 | 96 | 20 | 10 | 50 | 340 | 16 | 0.77 | 1.65 | Comparative Example 66 |
| 6.7 | 50 | 840 | 96 | 30 | 10 | 50 | 347 | 13 | 0.79 | 1.64 | Comparative Example 67 |
| 6.7 | 50 | 840 | 96 | 40 | 10 | 50 | 351 | 10 | 0.79 | 1.64 | Comparative Example 68 |
| 6.7 | 50 | 840 | 96 | 50 | 10 | 50 | 352 | 7 | 0.81 | 1.65 | Comparative Example 69 |
| 6.7 | 50 | 840 | 96 | 55 | 10 | 50 | 361 | 4 | 0.90 | 1.65 | Comparative Example 70 |
| 6.7 | 60 | 820 | 96 | −5 | 0 | 40 | 295 | 29 | 0.74 | 1.58 | Comparative Example 71 |
| 6.7 | 60 | 820 | 96 | 0 | 0 | 40 | 300 | 24 | 0.76 | 1.65 | Present Invention Example 44 |
| 6.7 | 60 | 820 | 96 | 10 | 0 | 40 | 308 | 20 | 0.72 | 1.65 | Present Invention Example 45 |
| 6.7 | 60 | 820 | 96 | 20 | 0 | 40 | 313 | 16 | 0.75 | 1.65 | Present Invention Example 46 |
| 6.7 | 60 | 820 | 96 | 30 | 0 | 40 | 318 | 13 | 0.76 | 1.65 | Present Invention Example 47 |
| 6.7 | 60 | 820 | 96 | 40 | 0 | 40 | 320 | 11 | 0.76 | 1.64 | Present Invention Example 48 |
| 6.7 | 60 | 820 | 96 | 45 | 0 | 40 | 324 | 8 | 0.89 | 1.64 | Comparative Example 72 |
| 6.7 | 70 | 820 | 96 | −15 | −10 | 30 | 278 | 30 | 0.76 | 1.59 | Comparative Example 73 |
| 6.7 | 70 | 820 | 96 | −10 | −10 | 30 | 290 | 24 | 0.71 | 1.64 | Present Invention Example 49 |
| 6.7 | 70 | 820 | 96 | 0 | −10 | 30 | 302 | 19 | 0.73 | 1.65 | Present Invention Example 50 |
| 6.7 | 70 | 820 | 96 | 10 | −10 | 30 | 310 | 15 | 0.72 | 1.65 | Present Invention Example 51 |
| 6.7 | 70 | 820 | 96 | 20 | −10 | 30 | 316 | 10 | 0.74 | 1.63 | Present Invention Example 52 |
| 6.7 | 70 | 820 | 96 | 25 | −10 | 30 | 319 | 8 | 0.75 | 1.64 | Present Invention Example 53 |
| 6.7 | 70 | 820 | 96 | 30 | −10 | 30 | 318 | 5 | 0.75 | 1.64 | Present Invention Example 54 |

TABLE 5-continued

| | Decarburization annealing condition | | | | | | Steel sheet which has been subjected to decarburization annealing | | Magnetic characteristics | | |
|---|---|---|---|---|---|---|---|---|---|---|---|
| Heating | | Soaking | | | | | | | | | |
| | Dew point | | | Dew point | | | | | | | |
| Rate of temperature rise (° C./s) | DP 1 at initial part (° C.) | Soaking sheet temperature (° C.) | Soaking time (sec) | DP 2 at latter part (° C.) | Range of dew point DP2 at latter part | | Oxygen content [O] (ppm) | Carbon content [C] (ppm) | B8(T) After | | Remarks |
| | | | | | Lower limit (60 − DP1) | Upper limit (100 − DP1) | | | W17/50 (W/kg) | 100 Hr aging | |
| 6.7 | 70 | 820 | 96 | 35 | −10 | 30 | 324 | 5 | 0.87 | 1.65 | Comparative Example 74 |
| 6.7 | 80 | 820 | 96 | −15 | −20 | 20 | 321 | 20 | 0.88 | 1.65 | Comparative Example 75 |
| 6.7 | 80 | 820 | 96 | −10 | −20 | 20 | 327 | 15 | 0.90 | 1.64 | Comparative Example 76 |
| 6.7 | 80 | 820 | 96 | 0 | −20 | 20 | 333 | 8 | 0.94 | 1.65 | Comparative Example 77 |
| 6.7 | 80 | 820 | 96 | 10 | −20 | 20 | 339 | 11 | 0.93 | 1.65 | Comparative Example 78 |
| 6.7 | 80 | 820 | 96 | 20 | −20 | 20 | 345 | 5 | 0.98 | 1.64 | Comparative Example 79 |
| 6.7 | 80 | 820 | 96 | 25 | −20 | 20 | 351 | 2 | 0.93 | 1.64 | Comparative Example 80 |
| 6.7 | 80 | 820 | 96 | 30 | −20 | 20 | 357 | 0 | 0.96 | 1.65 | Comparative Example 81 |

In the results shown in Table 5, in the example of the present invention, in the steel sheet which has been, subjected to decarburization annealing, a decarburization-annealed steel sheet having the oxygen content of 320 ppm or less and the carbon content of 25 ppm or less could be obtained. Furthermore, the grain-oriented electrical steel sheet obtained by forming the intermediate layer and the insulation layer using these decarburization-annealed steel sheets was an excellent electrical steel sheet having low iron loss.

For a thick material, decarburization serves as a bottleneck, which causes deterioration of magnetic aging of a final product. Thus, when a dew point DP1 at an initial part was 30° C. and 80° C. in all cases, good magnetic characteristics could not be, obtained.

Also, it was found that, when a relationship of DP1=40 to 70° C. and DP2≤DP1 and 60−DP1≤DP2≤100−DP1 is satisfied, an excellent grain-oriented electrical steel sheet having the oxygen content of 320 ppm or less and the carbon content of 25 ppm or less and low iron loss could be obtained even with a thick steel sheet having a thickness of 0.35 mm thicker than 0.23 mm.

INDUSTRIAL APPLICABILITY

According to the present invention, it is possible to provide a method for producing a grain-oriented electrical steel sheet in which a forsterite film is substantially absent. In the method for producing a grain-oriented electrical steel sheet according to the above aspect, when both decarburization and steel sheet oxidation suppression is achieved in a wide sheet thickness range, it is possible to produce a grain-oriented electrical steel sheet having low iron loss and a high magnetic flux density after magnetic aging.

REFERENCE SIGNS LIST

1 Heating furnace
2 Soaking furnace

The invention claimed is:

1. A method for producing a grain-oriented electrical steel sheet which has an intermediate layer containing silicon oxide as a main component on a surface of a base steel sheet in which a forsterite film is substantially absent and has an insulation coating on a surface of the intermediate layer, comprising:
  a decarburization annealing process of obtaining a decarburization-annealed steel sheet which has an oxygen content of 320 ppm or less and a carbon content of 25 ppm or less by subjecting a cold-rolled steel sheet containing Si to decarburization annealing;
  a final annealing process of heating the decarburization-annealed steel sheet in a state in which a surface of the decarburization-annealed steel sheet is coated with an annealing separator containing 10 to 50 mass % of MgO and 90 to 50 mass % of $Al_2O_3$ to cause secondary recrystallization to occur in a steel sheet;
  a removal process of obtaining a finally-annealed steel sheet by removing the annealing separator on the steel sheet which has been subjected to the final annealing process;
  an intermediate layer forming process of forming the intermediate layer by subjecting the finally-annealed steel sheet to thermal oxidation annealing; and
  an insulation coating forming process of forming the insulation coating on the finally-annealed steel sheet having the intermediate layer formed thereon,
  wherein the cold-rolled steel sheet contains, as a chemical composition, in terms of mass %,
  Si: 0.80 to 7.00%;
  C: 0.085% or less;
  acid-soluble Al: 0.015 to 0.065%;
  N: 0.012% or less;
  Mn: 1.00% or less;
  a total amount of S and Se: 0.003 to 0.015%; and
  the remainder: Fe and impurities.

2. The method for producing a grain-oriented electrical steel sheet according to claim 1, wherein, in the decarburization annealing process, in a soaking area configured to subject the cold-rolled steel sheet to decarburization annealing, an atmosphere gas is introduced from two locations which are an initial part and a latter part of the soaking area.

3. The method for producing a grain-oriented electrical steel sheet according to claim 2, wherein, in the decarburization annealing process, a dew point DP1 of the atmosphere gas introduced from the initial part of the soaking area is set to 40 to 70° C. and a dew point DP2 of the atmosphere gas introduced from the latter part of the soaking area satisfies DP2≤DP1 and 60−DP1≤DP2≤100−DP1.

4. A method for producing a grain-oriented electrical steel sheet which has an intermediate layer containing silicon oxide as a main component on a surface of a base steel sheet in which a forsterite film is substantially absent and has an insulation coating on a surface of the intermediate layer, comprising:

a decarburization annealing process of obtaining a decarburization-annealed steel sheet which has an oxygen content of 320 ppm or less and a carbon content of 25 ppm or less by subjecting a cold-rolled steel sheet containing Si to decarburization annealing;

a final annealing process of heating the decarburization-annealed steel sheet in a state in which a surface of the decarburization-annealed steel sheet is coated with an annealing separator to cause secondary recrystallization to occur in a steel sheet;

a removal process of obtaining a finally-annealed steel sheet by removing the annealing separator on the steel sheet which has been subjected to the final annealing process; and an intermediate layer-insulation coating forming process of forming the intermediate layer and the insulation coating on the finally-annealed steel sheet in one process, wherein the cold-rolled steel sheet contains, as a chemical composition, in terms of mass %, Si: 0.80 to 7.00%;
C: 0.085% or less;
acid-soluble Al: 0.015 to 0.065%;
N: 0.012% or less;
Mn: 1.00% or less;
a total amount of S and Se: 0.003 to 0.015%; and
the remainder: Fe and impurities, and in the intermediate layer-insulation coating forming process, a surface of the finally-annealed steel sheet is coated with a coating solution and annealed within a temperature range of higher than 650° C. to 950° C. or lower for 5 to 300 seconds in an atmosphere of a gas oxidation degree ($P_{H2O}/P_{H2}$) of 0.01 to 0.30.

5. The method for producing a grain-oriented electrical steel sheet according to claim 4, wherein, in the decarburization annealing process, in a soaking area configured to subject the cold-rolled steel sheet to decarburization annealing, an atmosphere gas is introduced from two locations which are an initial part and a latter part of the soaking area.

* * * * *